US009679410B1

(12) United States Patent
Saal et al.

(10) Patent No.: US 9,679,410 B1
(45) Date of Patent: Jun. 13, 2017

(54) SYSTEMS AND METHODS FOR PARAMETRIC MODELING OF THREE DIMENSIONAL OBJECTS

(75) Inventors: Peter L. Saal, Boulder, CO (US); Scott E. Lininger, Boulder, CO (US)

(73) Assignee: Trimble Inc., Sunnyvale, CA (US)

(*) Notice: Subject to any disclaimer, the term of this patent is extended or adjusted under 35 U.S.C. 154(b) by 1787 days.

(21) Appl. No.: 12/196,759

(22) Filed: Aug. 22, 2008

Related U.S. Application Data

(60) Provisional application No. 60/957,404, filed on Aug. 22, 2007.

(51) Int. Cl.
*G06T 17/00* (2006.01)
*G06T 17/20* (2006.01)
*G06T 19/00* (2011.01)
*G06T 17/10* (2006.01)

(52) U.S. Cl.
CPC ............ *G06T 17/20* (2013.01); *G06T 17/00* (2013.01); *G06T 17/005* (2013.01); *G06T 17/10* (2013.01); *G06T 19/00* (2013.01)

(58) Field of Classification Search
CPC ......... G06T 17/20; G06T 19/00; G06T 17/00; G06T 17/10; G06T 17/005
USPC ............... 345/419, 420; 703/1.2, 7, 14, 20; 700/97, 103; 702/22, 167; 705/26, 27; 707/10, 203
See application file for complete search history.

(56) References Cited

U.S. PATENT DOCUMENTS 5,583,977 A * 12/1996 Seidl .......................... 345/619
6,133,916 A   10/2000 Bukszar et al.
6,219,055 B1 *  4/2001 Bhargava et al. ........... 715/850
6,222,557 B1 *  4/2001 Pulley et al. ................ 345/622
6,392,645 B1 *  5/2002 Han et al. .................... 345/420
6,525,745 B1    2/2003 Phelan et al.
6,791,549 B2 *  9/2004 Hubrecht et al. ........... 345/473
6,931,604 B2 *  8/2005 Lane ............................ 715/853
7,477,232 B2    1/2009 Serra et al.
(Continued)

OTHER PUBLICATIONS

Steven M. Rubin, A 3-Dimensional Representation for Fast Rendering of Complex Scenes 1980, Bell Laboratories Holmdel, New Jersey 07733, pp. 1-7.*

(Continued)

*Primary Examiner* — Abderrahim Merouan
(74) *Attorney, Agent, or Firm* — Kilpatrick Townsend & Stockton LLP

(57) ABSTRACT

Systems and methods described herein can efficiently define parametric models across a wide range of fields, using a library of elements and variables with standardized meanings, such that the models can be used by various people and computer systems. In one embodiment, a system for parametric modeling of a three-dimensional object has a processor running a software program operable to configure the object by defining a zone comprising a root of a tree hierarchy, the zone having a three-dimensional region defining an outer dimension of the object to be modeled; a part comprising a child of the zone, the part also having a component object to be modeled, wherein the component object is an element of the object; and a variable comprising a child of the part, wherein variable has data defining characteristics of the zone or part. A user interface can display a representation of the three-dimensional object.

17 Claims, 14 Drawing Sheets

(56) References Cited

U.S. PATENT DOCUMENTS

| | | | |
|---|---|---|---|
| 7,590,497 B2 | 9/2009 | Tornquist et al. | |
| 7,669,158 B2* | 2/2010 | Kamat | 716/118 |
| 7,672,822 B2 | 3/2010 | Lee et al. | |
| 7,825,940 B1* | 11/2010 | Vieilly et al. | 345/619 |
| 7,940,259 B2* | 5/2011 | Wright et al. | 345/419 |
| 7,969,435 B1 | 6/2011 | DeSimone et al. | |
| 8,194,067 B2* | 6/2012 | Raby et al. | 345/420 |
| 8,259,101 B2 | 9/2012 | Shimada et al. | |
| 8,269,766 B2 | 9/2012 | Ogata et al. | |
| 8,311,320 B2 | 11/2012 | Endo et al. | |
| 2001/0055013 A1* | 12/2001 | Fuki | 345/419 |
| 2002/0012013 A1 | 1/2002 | Abe et al. | |
| 2002/0107673 A1* | 8/2002 | Haller et al. | 703/1 |
| 2004/0054516 A1* | 3/2004 | Oyasato et al. | 703/22 |
| 2004/0263509 A1* | 12/2004 | Serra et al. | 345/419 |
| 2005/0018058 A1* | 1/2005 | Aliaga et al. | 348/239 |
| 2005/0038540 A1* | 2/2005 | Hill et al. | 700/98 |
| 2005/0203718 A1* | 9/2005 | Carek et al. | 703/1 |
| 2006/0075371 A1* | 4/2006 | Kamat | 716/11 |
| 2006/0152521 A1* | 7/2006 | Paaso | 345/581 |
| 2006/0206587 A1 | 9/2006 | Fabbrocino | |
| 2007/0013709 A1* | 1/2007 | Charles et al. | 345/581 |
| 2007/0240152 A1 | 10/2007 | Li et al. | |
| 2008/0196022 A1 | 8/2008 | Diederichs | |
| 2008/0246762 A1* | 10/2008 | Ogata et al. | 345/420 |
| 2008/0297507 A1* | 12/2008 | Chen | G06T 7/0042 345/424 |
| 2008/0319833 A1 | 12/2008 | Svendsen | |
| 2009/0110297 A1* | 4/2009 | Endo et al. | 382/218 |
| 2011/0218776 A1* | 9/2011 | Shono et al. | 703/1 |
| 2013/0201189 A1 | 8/2013 | Saal et al. | |
| 2014/0003713 A1* | 1/2014 | Seow | G06T 5/009 382/164 |

OTHER PUBLICATIONS

U.S. Appl. No. 13/799,503, Final Office Action mailed on Jan. 30, 2014, 11 pages.

U.S. Appl. No. 13/799,503, Final Office Action mailed on Sep. 15, 2014, 13 pages.

U.S. Appl. No. 13/799,503, Non-Final Office Action mailed on May 8, 2014, 10 pages.

U.S. Appl. No. 13/799,503, Non-Final Office Action mailed on Jul. 8, 2013, 8 pages.

U.S. Appl. No. 13/799,503, Non-Final Office Action mailed Jan. 26, 2017, 15 pages.

\* cited by examiner

```
<zone name="ShelvingUnit">
  <var name="W" value="24" />
  <var name="H" value="18" />
  <var name="D" value="12" />

<part name="LeftSide">
    <var name="W" value="1" />
    <var name="H" formula="ShelvingUnit.H" />
    <var name="D" formula="ShelvingUnit.D" />
      <var name="X" value="0" />
      <var name="Y" value="0" />
      <var name="Z" value="0" />
  </part>

<part name="RightSide">
    <var name="W" value="1" />
      <var name="H" formula="ShelvingUnit.H" />
      <var name="D" formula="ShelvingUnit.D" />
      <var name="X" formula="ShelvingUnit.W-1" />
      <var name="Y" value="0" />s
      <var name="Z" value="0" />
  </part>

<part name="Shelf">
    <var name="W" formula="ShelvingUnit.W-2" />
      <var name="H" value="1 " />
      <var name="D" formula="ShelvingUnit.D" />
      <var name="X" value="1" />
      <var name="Y" value="0" />
      <var name="Z" formula="ShelvingUnit.H/2" />
  </part>
</zone>
```

FIG. 2A (XML)

```
var ShelvingUnit = {
  "ELEMENTTYPE":{"value","ZONE"},
  "W":{"value":24},
  "H":{"value":18},
  "D":{"value":12},
  "LeftSide":{
    "ELEMENTTYPE":{"value","PART"},
    "W":{"value":1},
    "H":{"formula":"ShelvingUnit.H"},
    "D":{"formula":"ShelvingUnit.D"},
    "X":{"value":0},
    "Y":{"value":0},
    "Z":{"value":0},
  },
  "RightSide":{
    "ELEMENTTYPE":{"value","PART"},
    "W":{"value":1},
    "H":{"formula":"ShelvingUnit.H"},
    "D":{"formula":"ShelvingUnit.D"},
    "X":{"value":0},
    "Y":{"value":0},
    "Z":{"formula":"ShelvingUnit.W-1"},
  },
  "Shelf":{
    "ELEMENTTYPE":{"value","PART"},
    "W":{"formula":"ShelvingUnit.W-2"},
    "H":{"value":1},
    "D":{"formula":"ShelvingUnit.D"},
    "X":{"value":1},
    "Y":{"value":0},
    "Z":{"formula":"ShelvingUnit.H/2"},
  },
};
```

FIG. 2B (JSON)

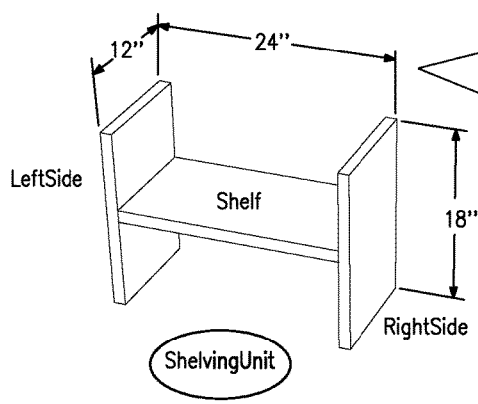

The same shelf as viewed in a variety of formats. Embodiments of the present invention are "data format" neutral.

FIG. 2C (3-Dimensional CAD Drawing)

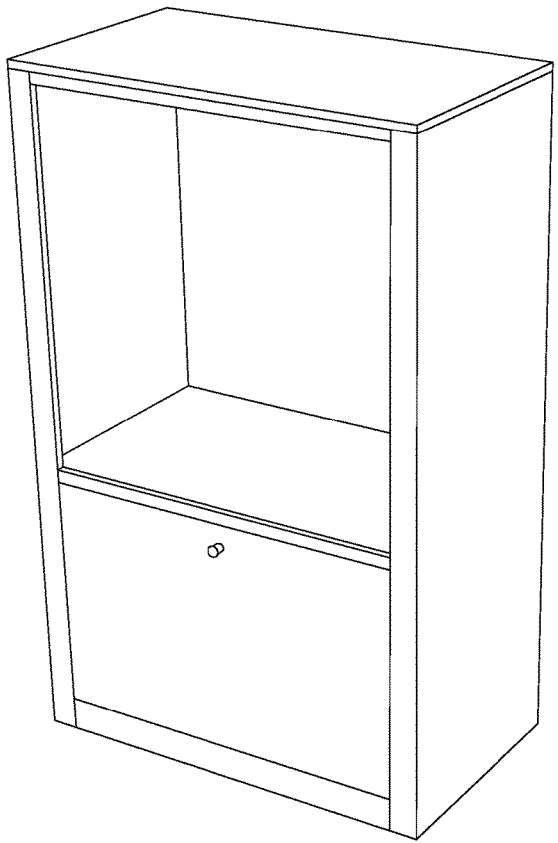
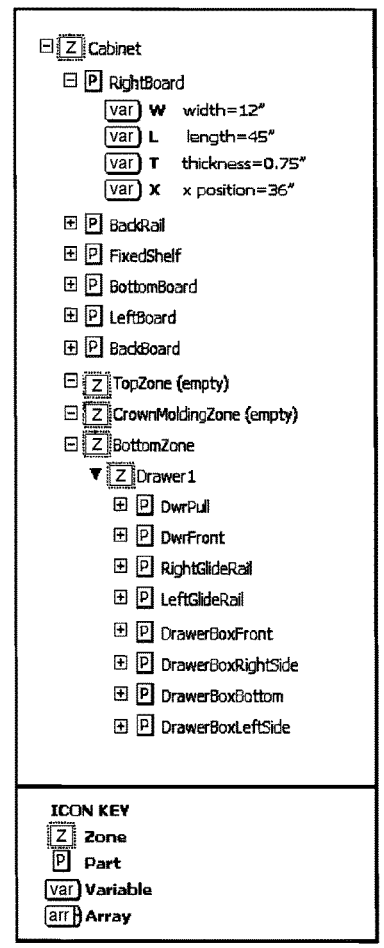
Cabinet
FIG. 3

SYSTEMS AND METHODS FOR PARAMETRIC MODELING OF THREE DIMENSIONAL OBJECTS

CROSS-REFERENCE TO RELATED APPLICATIONS

This application claims priority benefit, under 35 U.S.C. §102(e), of U.S. Provisional Patent Application Ser. No. 60/957,404, filed Aug. 22, 2007, entitled SYSTEMS AND METHODS FOR PARAMETRIC MODELING OF THREE DIMENSIONAL OBJECTS, which is incorporated by reference in its entirety.

TECHNICAL FIELD

Embodiments of the present invention relate generally to parametric three-dimensional object modeling and more particularly to computer implemented methods and systems for creating parametric three-dimensional design and model data that can be used in various design application environments.

BACKGROUND

In the field of computer aided design, three dimensional parametric modeling is used to design a variety of objects, predominantly mechanical parts, but also building products, furniture, animation characters and other objects that can have multiple variations of a model. Applying this method to define parametric behaviors of three dimensional objects, it is possible to develop generalized parametric data models that can be used to generate 3D objects within various three dimensional design application environments.

One potential benefit of parametric modeling is the ability to encapsulate all variations of an object without explicitly enumerating each instance. For example, a model of a simple passage door consisting of just nine parts can have several billion enumerations, all of which can be encapsulated within a single parametric model.

While parametric modeling has obvious benefits, commercially available parametric modeling systems require extensive training, even for expert users. These systems use tool sets that are often difficult to learn for less technical users such as architects, designers and students. These systems can export static geometry that is accessible to a wider user base, but the parametric model intelligence is often lost on export.

Companies invest significant resources in creating their parametric engineering models, and are rightfully concerned about disseminating this valuable information. Proprietary product configurators are increasingly used to present parametric models to end users in a user-friendly way that also protects the company's data. This often forces end users to learn a multitude of configuration systems with limited usefulness in their work flow.

SUMMARY

In one embodiment, a system for parametric modeling of a three-dimensional object may comprise a processor running a software program that is configured to define a zone comprising a root of a tree hierarchy. The zone can comprise a three-dimensional region defining an outer dimension of the three-dimensional object to be modeled. The software program may also define a part comprising a child of the zone. The part may further comprise a component object to be modeled, wherein the component object is an element of the three-dimensional object. Further, the software program may define a variable comprising a child of the part. The variable may further comprise data defining characteristics of the zone or the part. The software program may also define a user interface operable by the software program for displaying a representation of the three-dimensional object.

In another embodiment, a computer-implemented method for modeling a three-dimensional product may comprise defining a zone, in at least one storage device accessible to the computer processor, as a root of a tree hierarchy, wherein the zone comprises a three-dimensional space establishing the boundaries of the product. The method may further comprise defining a part, in at least one storage device accessible to the computer processor, as a child of the zone, the part defining a three-dimensional element of the product. The method may further comprise defining a variable, in at least one storage device accessible to the computer processor, as a nested child of the product or the part, the variable comprising data relating to the product or the part. And the method may also comprise modeling, on a display associated with the computer, the three-dimensional product based on the defined zone, part, and variable.

In yet another embodiment, a computer-implemented method for modeling a three-dimensional object may comprise receiving first input data representing an outer dimension of the three-dimensional object. The method may further comprise receiving second input data representing a component of the three-dimensional object. Additionally, the method may comprise receiving third input data representing variables of the component or the three-dimensional object, wherein a change to the third input data is reflected by a corresponding change to a dimension of the component or the three-dimensional object. Also, the method may further comprise rendering an image of the three-dimensional object on a graphical user interface.

In yet another embodiment, a system for representing a three-dimensional object may comprise a computer processor for processing parameters of the three-dimensional object. The system may further comprise a first element representing in at least one storage medium accessible to the computer processor a region that contains the three-dimensional object. The system further may comprise a second element in the at least one storage medium accessible to the computer processor representing a dimensions of a component of the three-dimensional object. The system may yet comprise a third element in the at least one storage medium accessible to the computer processor representing a first variable associated with the region and a second variable associated with the component. Additionally, the system may comprise a graphical user interface in communication with the computer processor for displaying a representation of the three-dimensional object based on the first, second, and third elements retrieved by the computer processor.

In another embodiment, a computer program product comprises a computer usable medium having computer readable program code embodied therein for modeling a three-dimensional object. The computer readable program code means in the computer program product has computer readable program code for defining a zone as a root of a tree hierarchy, the zone comprising a three-dimensional space establishing the boundaries of the object; computer readable program code for defining a part as a child of the zone, the part defining a three-dimensional element of the object; computer readable program code for defining a variable as a nested child of the object or the part, the variable comprising data relating to the object or the part; and computer readable program code for causing a computer to draw a three-dimensional object based on the defined zone, part, and variable.

BRIEF DESCRIPTION OF THE DRAWINGS

FIGS. 2A-2C show a code-level definition of a parametric product, using methods according to embodiments of the present invention, and showing how the same product can be represented in several different formats.

FIG. 3 shows another parametric product, with a tree hierarchy of all of the elements that comprise it, to show a nested relationship between the top level elements, according to embodiments of the present invention.

Figure 1A:
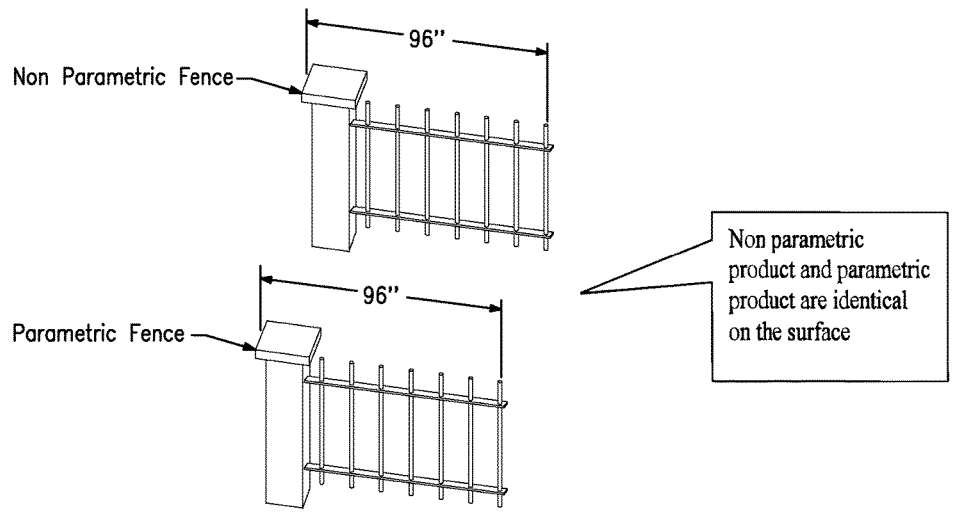
FIGS. 1A-1B illustrate differences between a parametric product and a non-parametric product, to set the stage for more detailed discussions.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention and the present disclosure.

DETAILED DESCRIPTION

Embodiments of the present invention include improved ways to generate and publish useful parametric product design and engineering information for use in a variety of industries, including but not limited to the construction industry. These and other needs are addressed by embodiments of the present invention by providing a lightweight, powerful and accurate method for presenting parametric products in an easy to use 3D format.

Parametric products are collections of typically 3-dimensional entities that contain embedded rules describing how they behave when the product itself is changed. Almost any object in the physical world could be represented as a parametric product. As the "parameters" of the model are altered, the individual parts that make up that model react as instructed by their embedded rules.

Figure 1B:
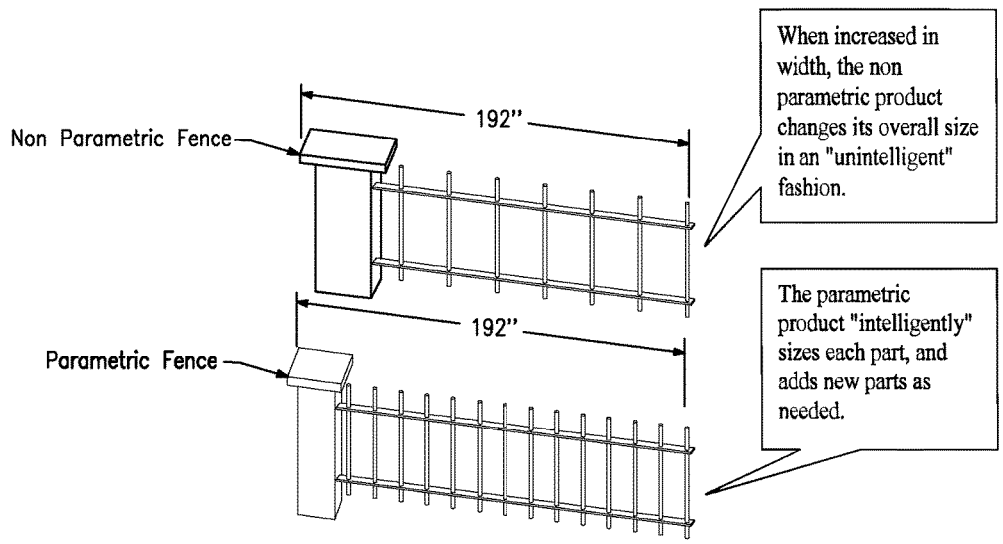

One example of a parametric product is a fence that automatically adds vertical slats as the overall fence is made longer. As the "length" parameter is increased, the vertical slats inside the product react appropriately. The resulting 3D model can then be used to generate pricing, output cutting lists, and to create CNC manufacturing programs for that object. FIG. 1A-1B illustrate this simple example, showing how a parametric product performs more intelligently than its non-parametric equivalent.

Another example is a kitchen cabinet that can be built with glued dowels, rabbets, or nails. If doweled construction is selected, then the parts inside the cabinet change themselves to include the appropriate drilled holes where the dowels are inserted. Instead of maintaining dozens or even hundreds of product drawings to represent these variations, the manufacturer can maintain a single parametric drawing that encapsulates all possible iterations.

Embodiments of the present invention include systems and methods for efficiently defining such parametric models across a wide range of fields, using a library of elements and variables with standardized meanings. Embodiments of the present invention are easy and flexible to use, particularly when compared with existing parametric technologies that are often extremely complicated, difficult to implement, and often focused on a particular field (i.e. metalworking, home construction, etc.)

Once a parametric product is defined using embodiments of the present invention, it becomes usable by a wide variety of persons and computer systems. It can be shared from product designer to consumer and on to the manufacturer. It can be imported into software tools to perform processing including, but not limited to, rendering the product in 3D, calculating material needs for manufacturing, purchasing the configured product over the web, generating sales orders, etc.

Data Format Independence

XML (eXtensible Markup Language) is one data exchange format that can be used, according to embodiments of the present invention, to describe a parametric product. XML is an industry-wide standard for moving data between computer systems. Although XML illustrates concepts and features of the present invention, one of ordinary skill in the art, based on this disclosure, will recognize that other existing or future languages and/or data exchange formats may be used according to embodiments of the present invention.

Many other languages besides XML can also be used. These include, but are not limited to: JSON object notation, a relational database of tables, object definitions in Ruby, C programming language STRUCTS, etc. Any data format that can accurately store the hierarchy of elements defined is usable. Embodiments of the present invention are "format neutral."

FIG. 2A-2C illustrates the same parametric product defined using embodiments of the present invention. Each figure shows a shelf unit made up of 3 parts, as represented in a different format. FIG. 2A shows how the product is described in XML, FIG. 2B is in JSON, and FIG. 2C is a 3D drawing as rendered by a CAD system. It is important to note how the same information is contained in all three formats.

Also, it is important to note that embodiments of the present invention enable a great variety of software tools to consume and/or create parametric products. Though these examples show the creation of parametric products using "hand-coding" of interfaces that expose raw XML, the typical end user will interact with "drag and drop" software tools that require little or no code-level knowledge, according to embodiments of the present invention.

The Six Elements

Some embodiments of the present invention include six elements that describe a parametric product. These elements relate to one another in a tree hierarchy. The root of the tree is always an element known as a zone. Beneath the root zone there can be any number of other nested elements, forming branches and leaves. FIG. 3 shows an exemplary tree of top level elements, as viewed inside a CAD tool, with a root zone containing several child zones, child parts, and child variables.

FIG. 2A shows an XML representation of a shelving unit product, containing a root zone element (represented by the opening ZONE tag at the beginning of the text) and two child parts, as well as a number of child variable (i.e., VAR) elements inside both the zone and the parts.

As is standard with XML, child elements in the tree are represented as nested XML tags. As FIG. 2A demonstrates, the name of the XML tag corresponds with the type of element it represents.

Following is a description of the six element types:

ZONE Element

A zone is an imaginary 3-dimensional box. Functionally, it is an invisible region inside the product that contains parts. It has a particular size, location, and rotation in space. (These are defined by a series of child variables with particular names. See VARIABLE below.)

Every parametric product contains at least one zone (the bounding box that contains the entire product, which is also the root of the tree hierarchy.)

For example, if one were defining a parametric stool that was 36 inches tall and 18 inches in diameter, there would be an imaginary, 6-sided zone 36 inches tall, 18 inches wide, and 18 inches deep, forming a perfect wrapper around the entire product. This would be its root zone.

Complex products might include several zones. Each zone in a product is given a name. This name provides a way of referring to that zone when writing variable formulas. (See Variable Formulas below.)

The following is an example of how a zone is defined in XML:
<zone name="MyZone">
. . . child elements appear here . . .
</zone>

Zones can be nested, meaning any zone can contain other zones. In such a case, the containing zone is known as the "parent" and the others are known as "children."

PART Element

A part is a 3-dimensional object inside the product, such as a board, a plastic panel, a screw, a hinge, etc. Anything that one would think of as a "part" of the product in the real world will have a corresponding part in the parametric representation of it. Most products contain many parts. Parts have a particular size and location in space, as well as a shape, color, material, rotation, behavior, etc. (These are defined by a series of child variables with particular names. See VARIABLE below.)

Each part in a product is given a name. This name provides a way of referring to that part when writing variable formulas. (See Variable Formulas below.) The following is an example of how a part is defined in XML:
<part name="MyPart">
. . . child elements appear here . . .
</part>

Each part is contained inside a zone. The zone is known as the "parent" and the part is known as the "child." A zone can contain any number of child parts.

VARIABLE (Aka VAR) Element

Variables (also known by the shorthand "var") are elements that are nested inside a part or a zone. Functionally they are similar to variables in any computer programming environment, in that they have a name and a value.

Variables are contained inside zones, parts, or arrays (see ARRAY below). The containing element is known as the "parent" and the variable is known as a "child". Each variable represents one piece of data that defines something about its parent.

A zone or part element can have any number of variables. When authoring a parametric product, one may create as many variables as needed to fully represent its variations and behaviors. Simple parts might have only a handful of variables that define everything about them, while complex parts might contain dozens.

Embodiments of the present invention define a library of variable names that have a particular meaning and usage. These variables are known as "reserved" variables. By convention, the names of reserved variables are often written in all capital letters to help delineate them from non-reserved variables.

The variable "L" for example, is a reserved variable used to define a part's length. If one creates a variable named "L" inside a part and gives it a value of "10", then that part will assume a length of 10 inches. (All linear measurements according to the examples in this document are defined in inches by default, but any other unit can be used, including but not limited to millimeters, miles, meters, etc.).

In certain embodiments, non-reserved variables can be named almost anything the author desires, with the following restrictions: variable names may contain any combination of letters and numbers, but not spaces or special characters, according to embodiments of the present invention. One could create a variable called "TireSize1" for example, but not one called "Tire Size #1", because the spaces and pound character are not allowed.

The following is an example of how a variable is defined in XML:
<var name="MyVariable" value="10"/>

Variables are case-insensitive. The variable "SHOESIZE" is the same variable as "ShoeSize". In programming parlance, variables are "loosely typed." They can contain integers, floating point numbers, or strings.

OPTION Element

Option elements are children of a variable, according to embodiments of the present invention. They define a set of specific values that the parent variable can be set to when an end user configures a parametric product.

This is a simple and effective way of providing interactivity within a parametric product. The manufacturer could, for example, provide a parametric model with options that show all of the colors that their product is available in. Here is an example of how a list of options may be defined in XML:
<var name="ChairSize" value="20">
  <option name="Small" value="16"/>
  <option name="Medium" value="20"/>
  <option name="Large" value="24"/>
</var>

In this example, a computer aided interior design application would allow a room designer to choose from three sizes of available chair and see a 3D model of it "on the fly" or in substantially "real time."

Like variables, options have a name and a value. Unlike variables, there are no restrictions on what the name of the option can be. One could create an option named "Sized Medium #6, 24 inches in height, with red trim" without a problem. When an end user selects an option from the list, the value stored inside that option is applied to the value of the parent variable.

ARRAY Element

Arrays are collections of variables that can be contained inside a part or a zone. They are similar to arrays in any computer programming environment. They have one name but can contain multiple values.

Arrays in the present invention can be associative or linear. Associative arrays contain a set of values that are accessed using string names, whereas linear arrays contain a series of values that are accessed via an integer index.

The following is an example of defining an array in XML:
    <array name="dragChanges">
        <var value="TopBoard.x"/>
        <var value="BottomBoard.x"/>
    </array>

When authoring a parametric product, one may create as many non-reserved arrays as desired. Like variables, array names may contain any combination of letters and numbers, but not spaces or special characters.

Also like variables, there are certain array names that are reserved, meaning that they have a particular meaning in the realm of parametric modeling and thus cannot be used for defining arbitrary data. An exhaustive list of reserved array names is provided below.

INCLUDE Element

The include element provides the ability to reuse and share parametric data across multiple parts, products, or even entire product lines.

The include element can be contained anywhere inside the product's hierarchy tree. When it is encountered by a computer system, its "leaf" on the tree is automatically replaced with a leaf (or entire branch) of data that is contained in an external file or data store. Specifically, the data is loaded from a URL (Uniform Resource Locator) address. This URL points to any properly-structured data source on the World Wide Web, a corporate intranet, the computer user's hard drive, etc.

Figure 4A:
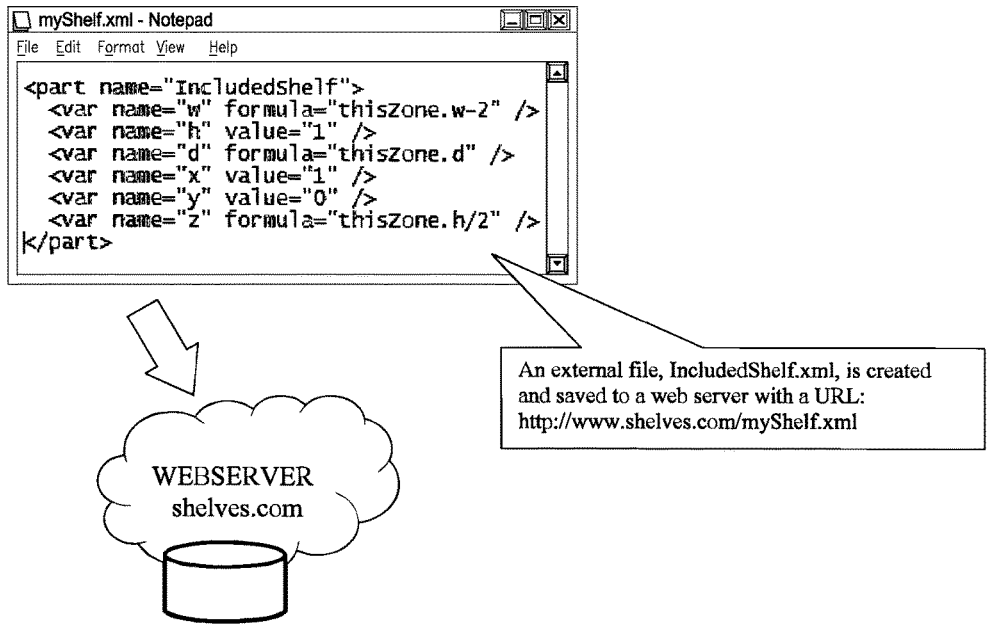
FIG. 4A-B illustrates how the "include" element functions with an example of using an Include to add a part to an existing product via a World Wide Web connection, according to embodiments of the present invention.
Figure 4B:
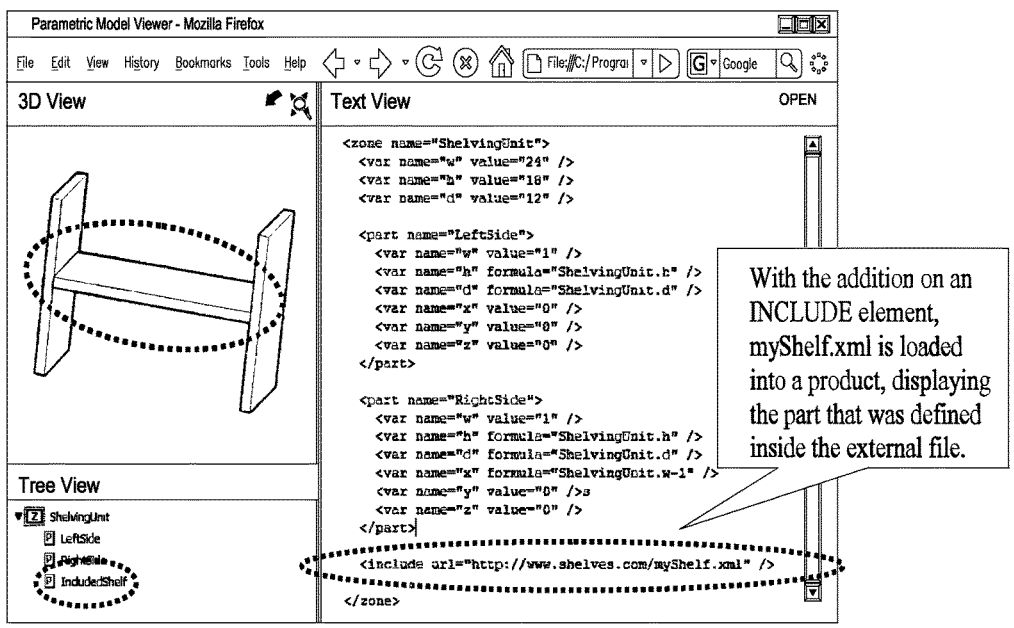
Figure 4C:
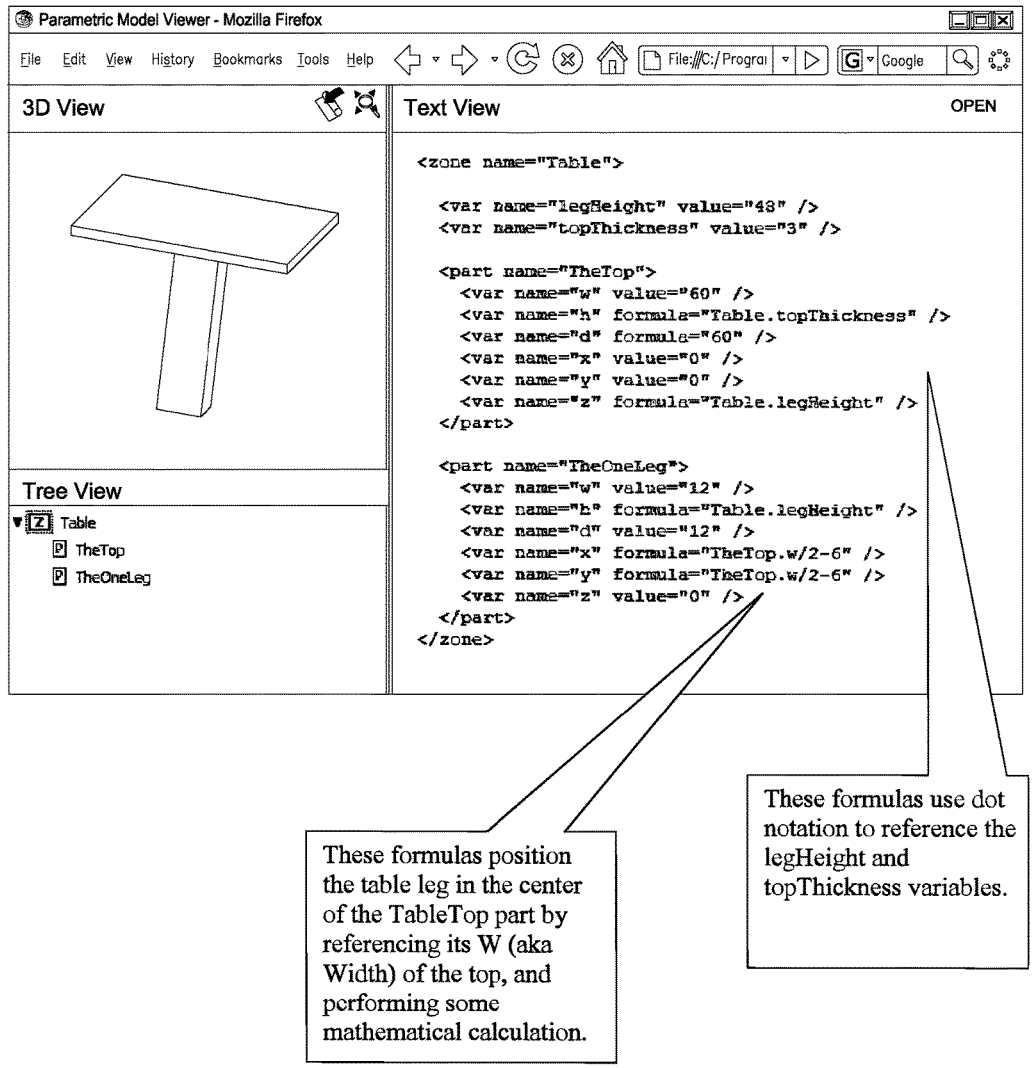
FIG. 4C illustrates the use of dot notation and some example of variable formulas, according to embodiments of the present invention.

FIGS. 4A-4B illustrates how an include is replaced within a hierarchy tree. By using include elements, one can create extremely flexible product catalogs that exist on the world wide web, allowing manufacturers and designers to host up-to-date versions of their parametric products, use common parts and construction standards across multiple products, and greatly ease the challenge of sharing complex catalogs with other people and computer systems.

Variable Formulas

As has been described, variables have a name and a value. This value can be in the form of a number, such as "10" or a string, such as "Steel Case®". Variables can also have an attribute called a "formula" that can change the variable's value. Such formulas provide a means to create "intelligent" behaviors inside parametric products, according to embodiments of the present invention.

Formulas are mathematical expressions. They can contain operators including, but not limited to, addition, subtraction, multiplication, division, and boolean comparison to arrive at predictable results based on the product's current state. These operators act upon static values contained in the formula or on dynamic values that are pulled from variables anywhere inside the product's hierarchy tree. Often, the operands in a formula are themselves derived from the results of other formulas elsewhere in the parametric product.

For example, the following snippet of XML defines a variable without a formula:
    <var name="myAge" value="32"/>

This variable is "static", meaning its value is set at 32 and will never change. Here is another example, this time using a simple formula:
    <var name="price" formula="180+12"/>

At run time, this variable's formula will be executed, arriving at the mathematical result of "192" (180+12=192).

One can also refer to other variables within the hierarchy tree to arrive at much more complex interactions. Here are three variables that interact:
    <var name="leg" value="48"/>
    <var name="stooltop" value="3"/>
    <var name="H" formula="leg+stooltop"/>

Here, the computer system reading the parametric model would calculate the variable "H" as 51 (48+3=51). The variable H is a reserved variable that controls the height of a part or zone. Thus, if the example code above were nested into a zone, it would dynamically change the total height of the zone to 51 inches.

The order of operations in variable formulas follows normal algebra rules. As in algebra, parentheses can be used to force a particular order of operations.

In addition to numeric values, literal string values can be used in a formula by delineating the string with single quote marks. Here is an example of this:
    <var name="SKU" value="'POP'+6/2+'B'"/>

After this formula is executed, the variable name "SKU" will contain a string value of "POP3B". The "6/2" operation is performed first, then it is concatenated with the string literals;

Referring to variables elsewhere in the hierarchy tree requires use of dot notation. Dot notation is a way to locate something inside a tree using the names of each branch or leaf one is trying to reference. (Dot syntax is common in C, C++, and Java programming environments, among others.)

For example, the following snippet of dot notation refers to the "H" variable's value that is contained inside the FrontLeg element, which is turn is contained in the MyTable zone. Each dot (.) represents one level deeper into the tree.
    MyTable.FrontLeg.H There are a few "shortcuts" provided in the present invention to shorten the formulas. The term "thisPart" refers to the parent part of the current variable. So instead of writing:
    MyTable.Drawer.DrawerFront.Pull.X
one could use the following shortcut for any variable formula that is contained inside the Pull part:
    thisPart.X Another shortcut is "thisZone" which refers to the parent zone of the variable, or in the case of a variable that is nested in a part, to the part's parent zone.

A computer system that reads a parametric product will execute these formulas at run time to determine each variable's current value. As the end user chooses options to configure their product, the various formulas throughout will "fire" or execute in sequence, allowing the product to dramatically alter its construction and appearance in whatever fashion the original author intended.

Figure 5:
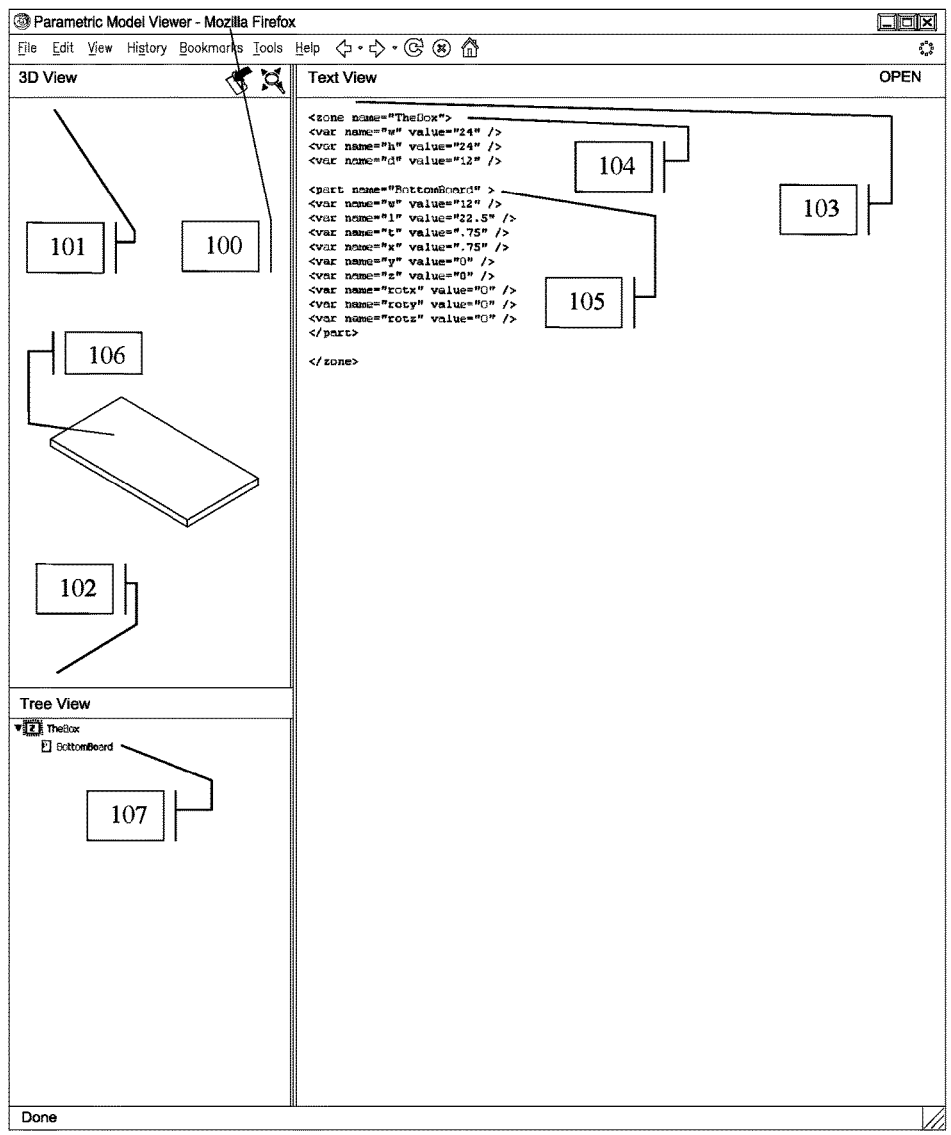
FIGS. 5-12 show examples of building parametric products according to embodiments of the present invention.

FIG. 5 shows a product with several formulas in place. FIG. 5 illustrates a screen shot of an exemplary parametric modeling application environment 100 that provides three simultaneous views of the parametric model: a 3D View 101, a Tree View 102 and a Text View 103. The text block contains an exemplary root level element called "TheBox" 104 with width, height and depth variables and a part element called "BottomBoard" 105 with part dimensions expressed as width, length, and thickness variables; part position expressed as x, y and z coordinates, and an orientation expressed as a predefined Cartesian plane, or as one or more rotations around the x, y and/or z axes. When the text block has been entered by the user, it is simultaneously displayed in the 3D View, as shown, the first part 106 is visible in the 3D View and in the Tree View 107.

Figure 6:
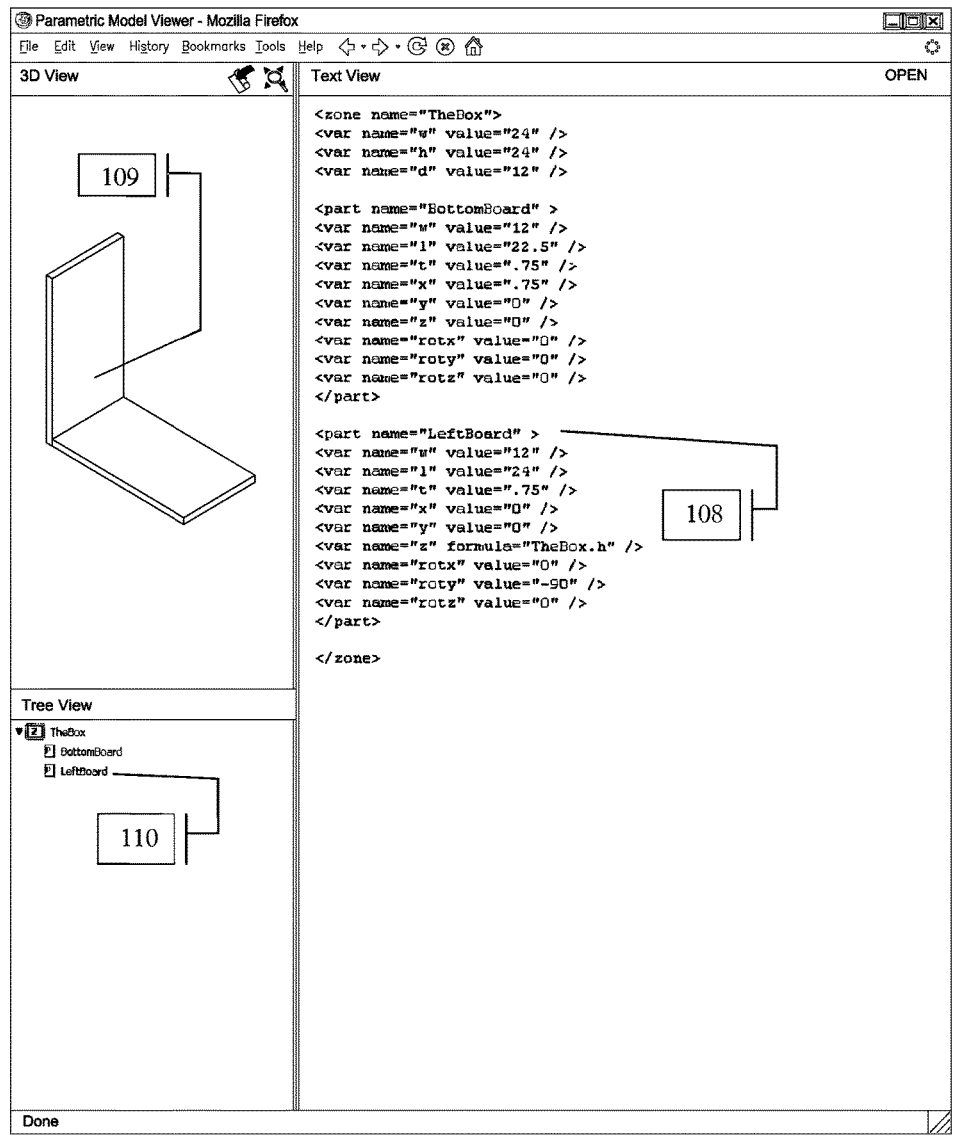

FIG. 6 illustrates a screen shot showing a new part called "LeftBoard" 108 added in the Text View, and appearing in the 3D View 109 and the Tree View 110. Note that the orientation and x, y, and z coordinates have been changed to position and rotate the part in space. Notice also that all of the numerical data are expressed as values.

Figure 7:
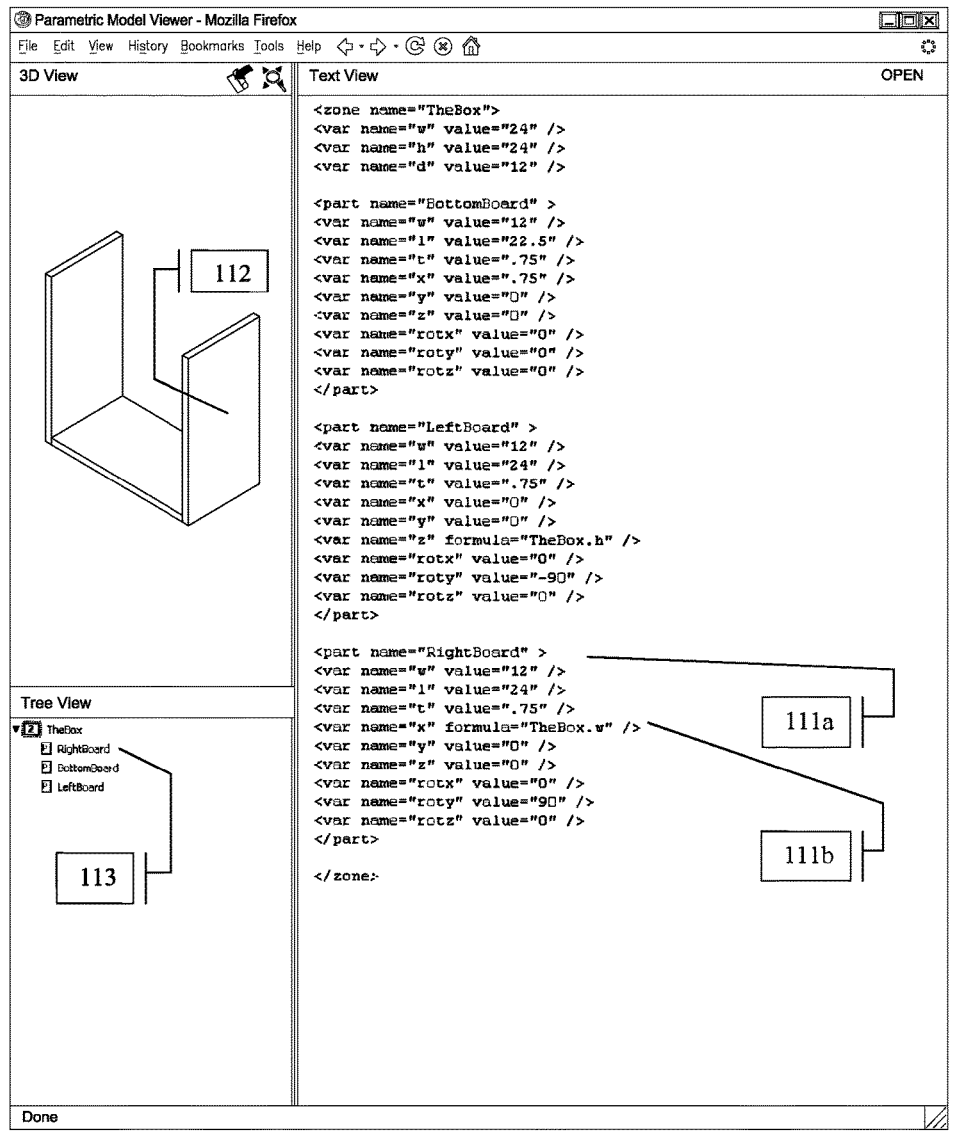

FIG. 7 illustrates a screen shot showing a new part called "RightBoard" 111*a* added in the Text View, and appearing in the 3D View 112 and the Tree View 113. The orientation and x, y, and z coordinates have been changed to position and rotate the part in space. All of the numerical data are expressed as values except for the x position of the Right-Board part, which is expressed as a formula 111*b* that relates its x position to the length of the adjacent BottomBoard part.

Figure 8:
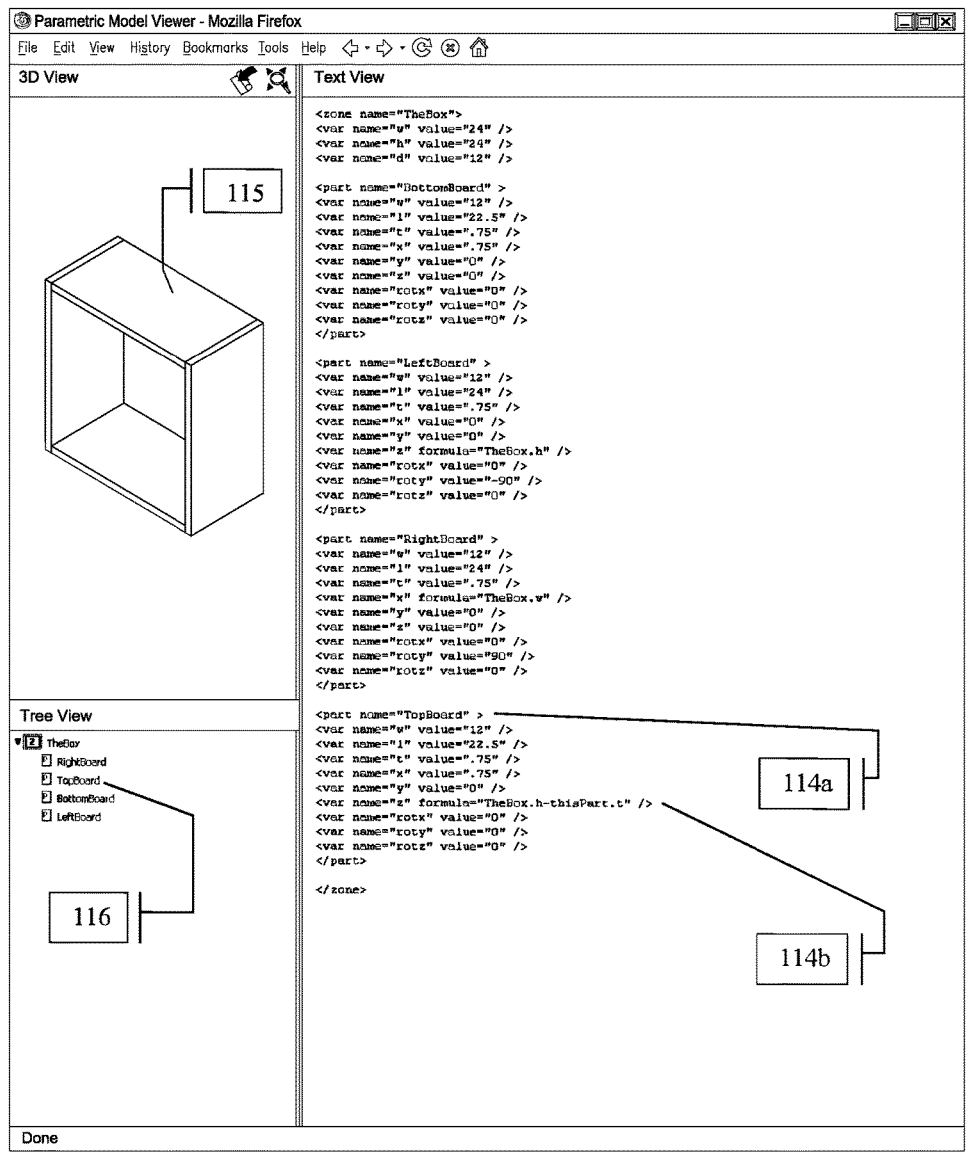

FIG. 8 illustrates a screen shot showing a new part called "TopBoard" 114*a* added in the Text View, and appearing in the 3D View 115 and the Tree View 116. Again, the orientation and x, y, and z coordinates have been changed to position and rotate the part in space. Notice that the x position of the TopBoard part is expressed as a formula 114*b* that relates its x position to its own length.

Figure 9:
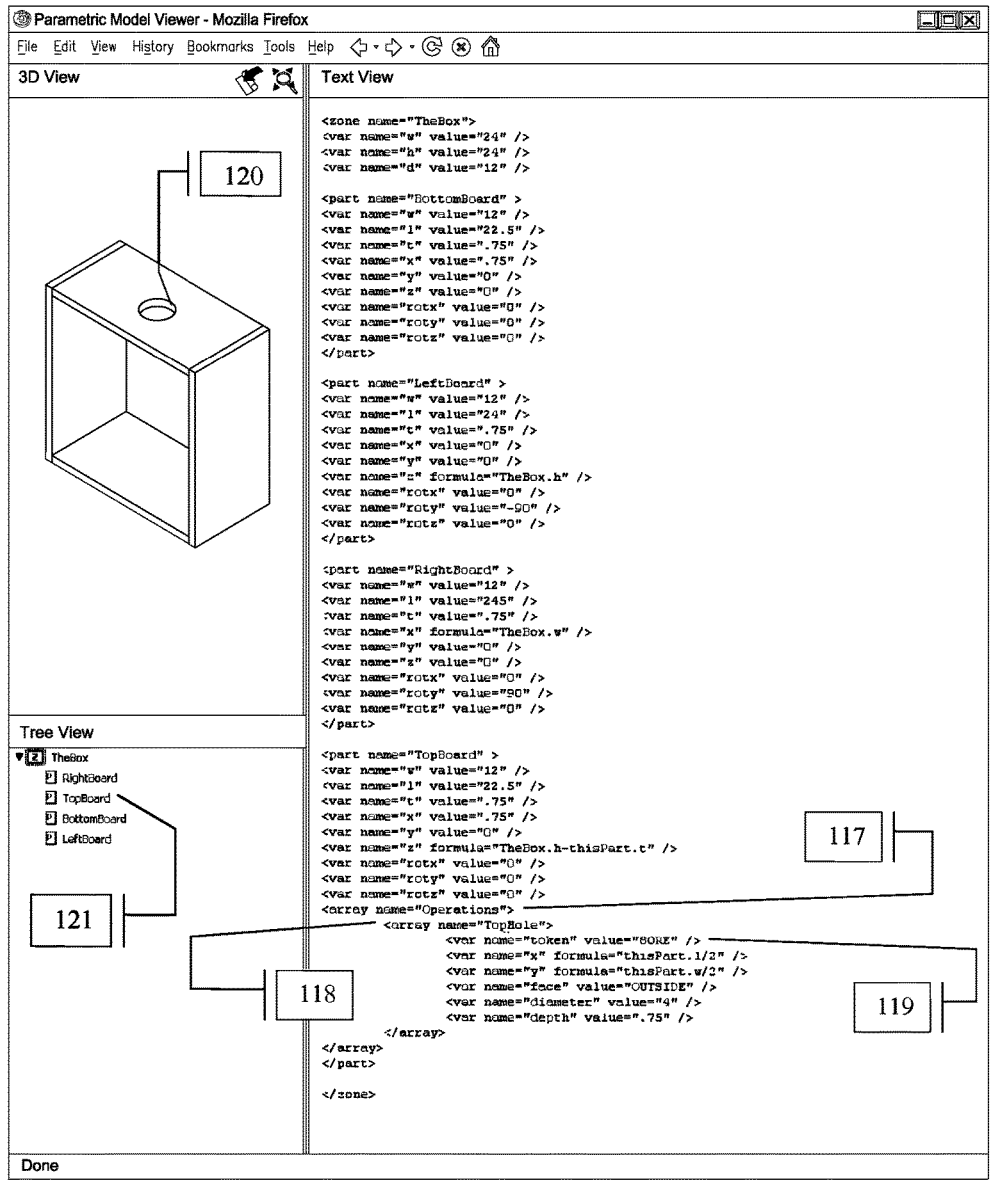

FIG. 9 illustrates a screen shot showing an Operation 117 for "TopHole" 118, using a token (which is an example of an operation type and should be recognized as such when referred to below) called BORE 119 added in the Text View, and appearing in the 3D View 120. The Tree View 121 does not display the added operation, which is by example, but not by limitation. If the user chose to visualize the lower-level elements in the Tree View, such as formulas, operations and the like, the user can do so.

Figure 10:
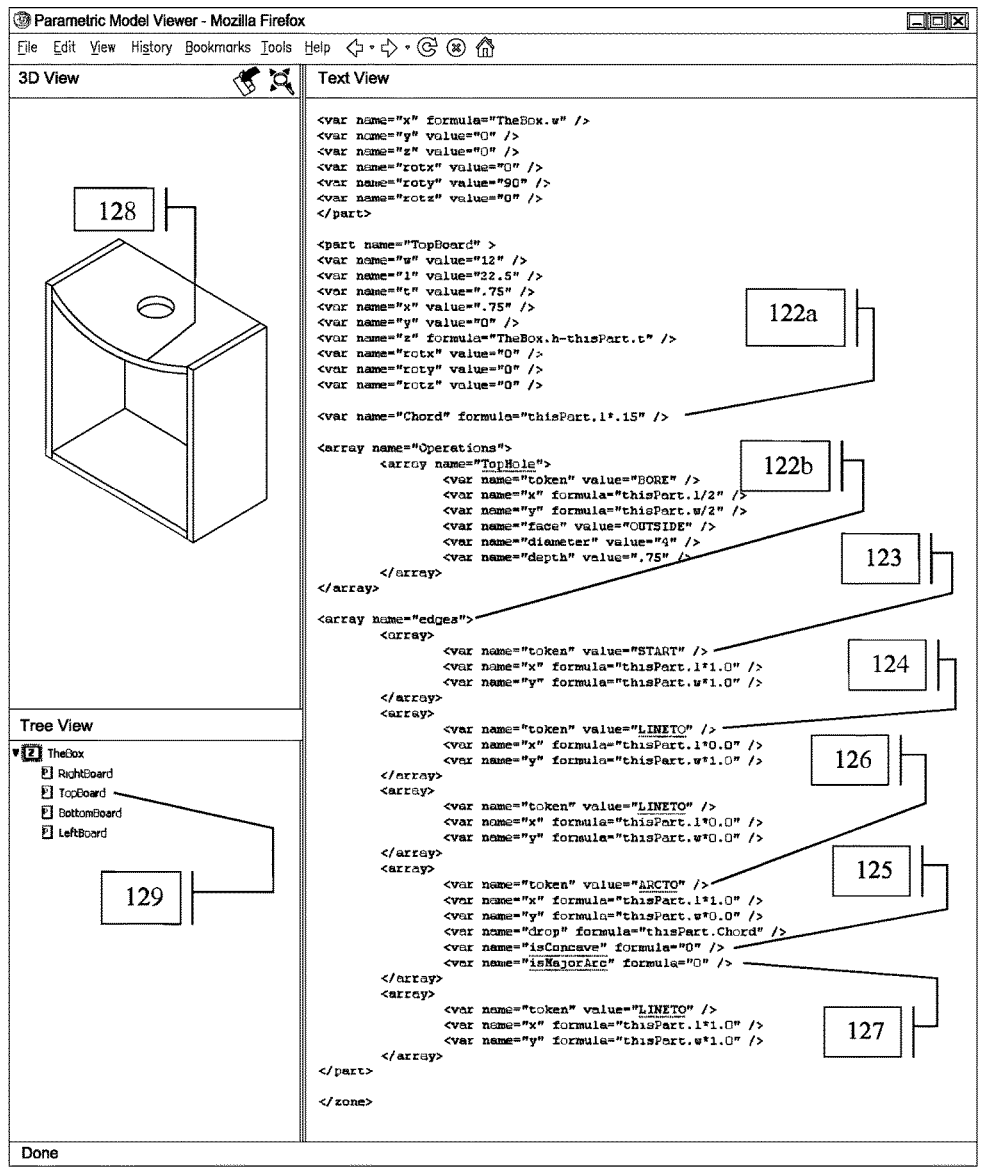

FIG. 10 illustrates the addition of a part variable called "Chord" 122*a* and an array called "edges" 122*b*, which consists of a START token 123 followed by a sequence of LINETO 124 and ARCTO 125 statements. The ARCTO block contains the special variables "isConcave" 126 and "isMajorArc" 127. These variables determine which side of the start and end points the arc bulges toward, and whether the arc is major or minor within the included angle of the arc. The 3D View 128 is updated, while once again, the Tree View 129 presents only the high-level elements.

Figure 11:
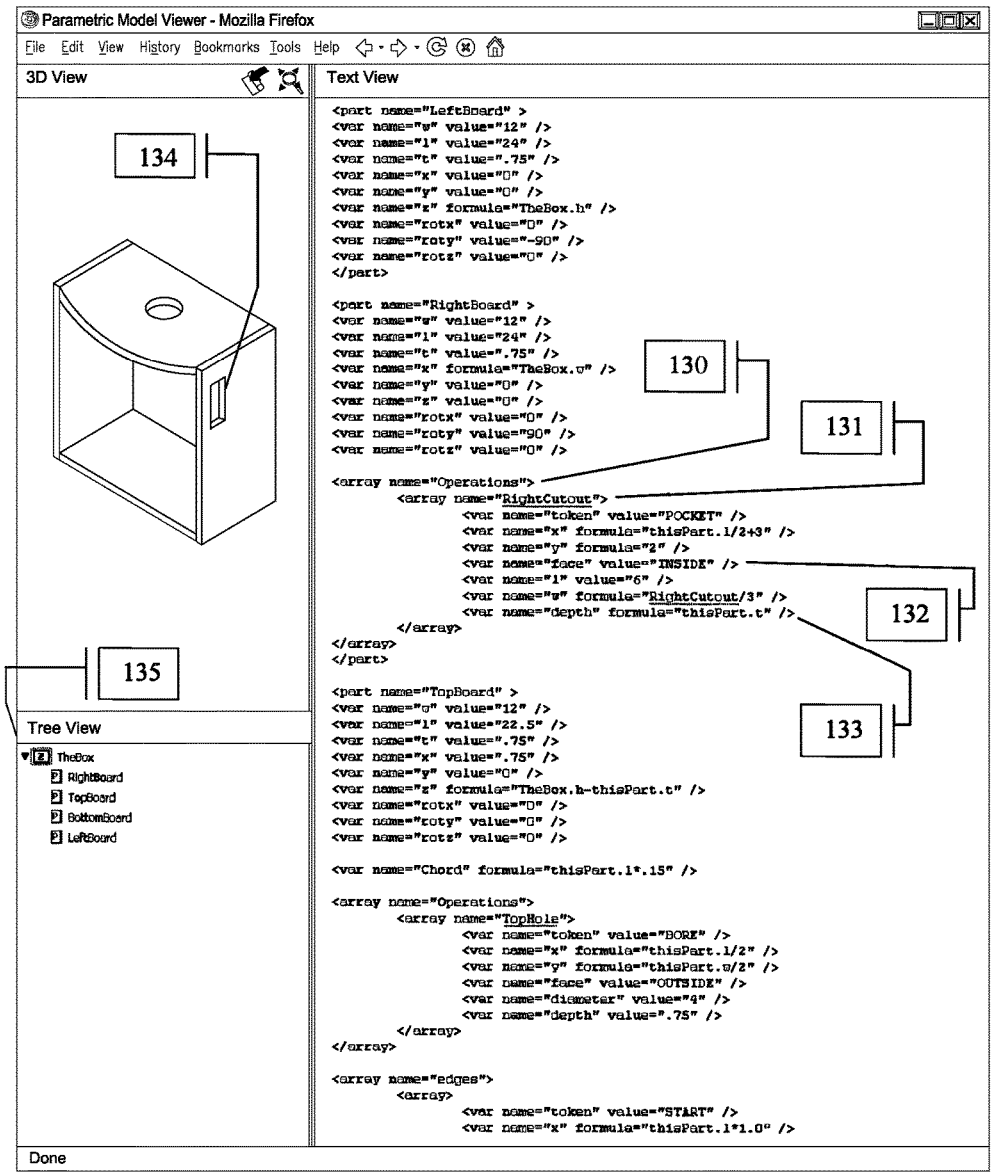

FIG. 11 illustrates the addition of a rectangular cutout called "RightCutout" 130, which has been added to the RightBoard part. The cutout uses the POCKET token 131 which is oriented on the INSIDE face 132 with a depth 133 of 0.75" 133. The cutout is visible in the 3D View 134 but the RightBoard does not display the lower-level operations 135.

Figure 12:
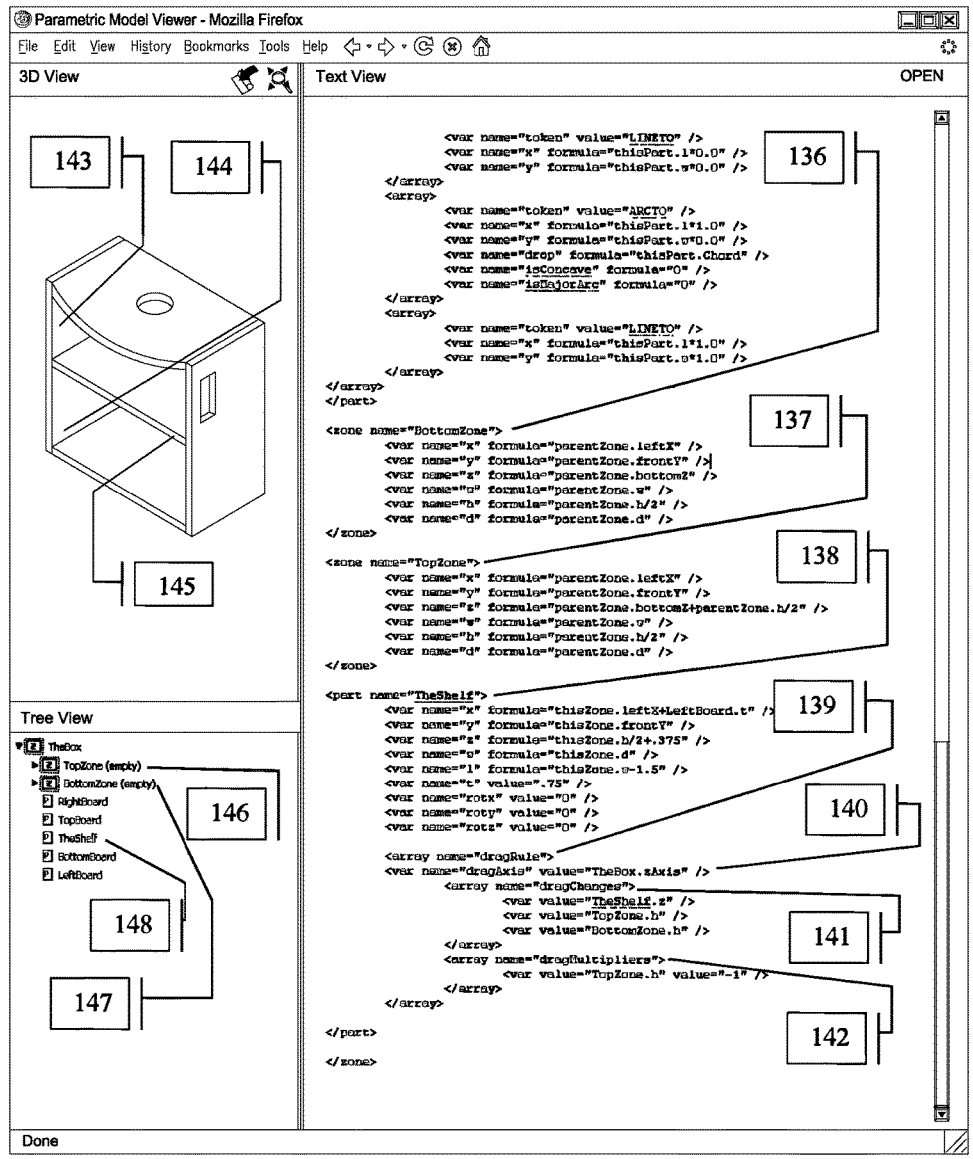

FIG. 12 illustrates the addition of two internal zones shown in Text View 136 and 137 and in 3D View 143 and 144 and in the Tree View 146 and 147. Also a new part called "TheShelf" has been added 138, 145 and 148. Each of the zones makes use of the ParentZone system variable, which enables a zone or part to look up a value from the next higher level zone or part in the tree hierarchy. In this case the size and position of the zones refer to the size and position of the parent zone that contains them. In this manner, changes to the overall size and configuration of the parent can be used to drive the subsidiary zones and parts.

Also shown is a "dragRule" 139 which changes the size and position of the specified elements when a part is dragged in the 3D View with a mouse pointing device. The "drag-Axis" 140 determines the direction along which the part can be dragged. The "dragChanges" 141 array allows the user to specify the zones, parts and dimensions that a drag event will change and the "dragMultipliers" 142 are optionally used to cause a proportional or inverse change in the magnitude of the drag. In the example, the "TopZone.h" has a dragMultiplier of −1, with the result that as the Shelf part is dragged up along the dragAxis, Z, the height of the TopZone will decrease by the distance of the drag, while other dragChanges elements will increase as the Z value of the Shelf increases.

Exemplary Computer System Overview

Figure 13:
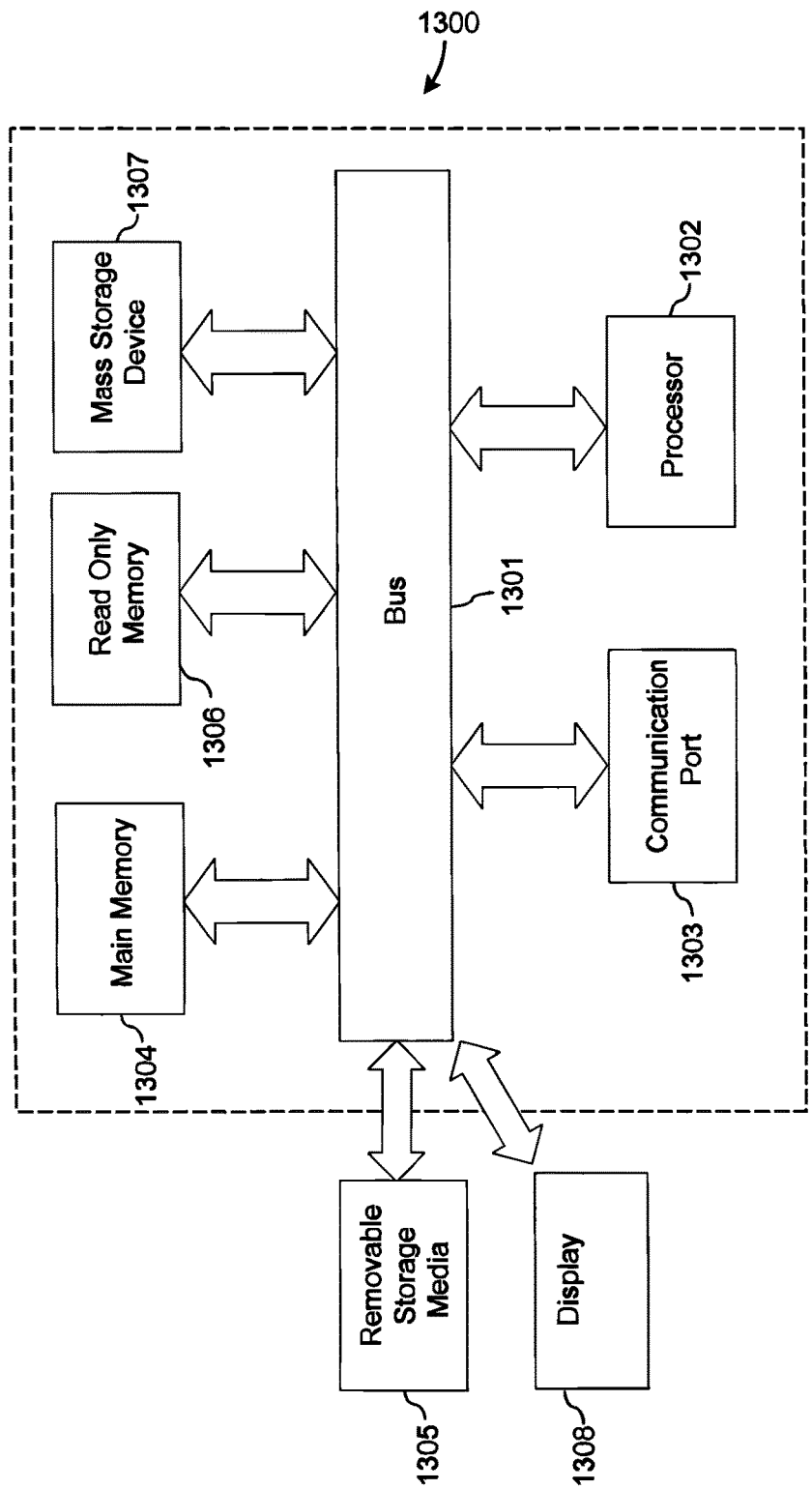
FIG. 13 is an example of a computer system, with which embodiments of the present invention may be utilized.

Embodiments of the present invention include various steps a variety of which may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 13 is an example of a computer system 1300, with which embodiments of the present invention may be utilized. According to the present example, the computer system includes a bus 1301, at least one processor 1302, at least one communication port 1303, and a main memory 1304. System 1300 may also include a removable storage media 1305, a read only memory 1306, and/or a mass storage component/device 1307.

Processor(s) 1302 can be any known processor, including, but not limited to, an Intel® Itanium® or Itanium 2® processor(s), or AMD® Opteron® or Athlon MP® processor(s), or Motorola® lines of processors. Communication port(s) 1303 can be any of an RS-232 port for use with a modem based dialup connection, a 10/100 Ethernet port, or a Gigabit port using copper or fiber. Communication port(s) 1303 may be chosen depending on a network such a Local Area Network (LAN), Wide Area Network (WAN), or any network to which the computer system 1300 connects.

Main memory 1304 can be Random Access Memory (RAM), or any other dynamic storage device(s) commonly known in the art. Read only memory 1306 can be any static storage device(s) such as Programmable Read Only Memory (PROM) chips for storing static information such as instructions for processor 1302.

Mass storage 1307 can be used to store information and instructions. For example, hard disks such as the Adaptec® family of SCSI drives, an optical disc, an array of disks such as RAID, such as the Adaptec family of RAID drives, or any other mass storage devices may be used.

Bus 1301 communicatively couples processor(s) 1302 with the other memory, storage and communication blocks. Bus 1201 can be a PCI/PCI-X or SCSI based system bus depending on the storage devices used.

Removable storage media 1305 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Display 1308 may be any device operable to present visual representations of parametric models and permit users to view, change, and interact with parametric models according to embodiments of the present invention, including but not limited to graphical web interfaces and computer monitors.

The components described above are meant to exemplify some types of possibilities. In no way should the aforementioned examples limit the scope of the invention, as they are only exemplary embodiments.

that do not include all of the described features. Accordingly, the scope of the present invention is intended to embrace all such alternatives, modifications, and variations as fall within the scope of the present disclosure, together with all equivalents thereof.

SIZING AND POSITIONING

| Reserved Name | Element | Contained in | Description |
| --- | --- | --- | --- |
| W | VAR | PART or ZONE | These 3 related vars define the width, height, and depth |
| H | VAR | PART or ZONE | of their parent element. |
| D | VAR | PART or ZONE | XML Example:<br><zone name="MyZone"><br>  <var name="W" value="24" /><br>  <var name="H" value="24" /><br>  <var name="D" value="24" /><br></zone> |
| L | VAR | PART or ZONE | These 3 related vars are an alternate to W/H/D for |
| W | VAR | PART or ZONE | defining the size of a part or zone. They refer to |
| T | VAR | PART or ZONE | Length, Width, and Thickness, which is a common way that manufacturers define sheet products |
| X | VAR | PART or ZONE | These 3 related variables define the x, y, and z position |
| Y | VAR | PART or ZONE | of the parent element's origin point in space, as |
| Z | VAR | PART or ZONE | measured from the root zone's origin point.<br>XML Example:<br><part name="MyPanel"><br>  <var name="X" value="0" /><br>  <var name="Y" value="12" /><br>  <var name="Z" value="-5" /><br></part> |
| ROTX | VAR | PART or ZONE | These 3 related variables define the rotation in degrees |
| ROTY | VAR | PART or ZONE | of the parent element about each of the three axes. |
| ROTZ | VAR | PART or ZONE | Since rotation transformations will provide a different result based on the order one applies them, these rotations are always performed in the same order: first rotation is about the X axis, second is about the Y axis, and third is about the Z axis.<br>XML Example:<br><part name="MyPanel"><br>  <var name="ROTX" value="0" /><br>  <var name="ROTY" value="90" /><br>  <var name="ROTZ" value="-45" /><br></part> |
| ORIENTATION | VAR | PART or ZONE | ORIENTATION can contain any of the following string values: TOPPANEL, BOTTOMPANEL, LEFTPANEL, FRONTPANEL, RIGHTPANEL, or BACKPANEL. These are a shortcut method of positioning sheet panel parts into a useful transformation in space without having to figure out the ROTX, ROTY, and ROTZ manually. |
| ROUGHL | VAR | PART or ZONE | These 3 related variables can be used to define the |
| ROUGHW | VAR | PART or ZONE | "rough" Length, Width, and Thickness of a part. Useful |
| ROUGHT | VAR | PART or ZONE | for manufacturers who cut a rough piece of material to a slightly larger size than the finished part, then machine it down from there to a finished size. These values, if defined, will show up on cut lists generated for this product. |

Reserved Library

The tables below are an exemplary list of reserved variable names and how they function, according to embodiments of the present invention. By adding these arrays and/or variables to a part or zone, one can create interactive, parametric products of almost any kind imaginable.

Various modifications and additions can be made to the exemplary embodiments discussed without departing from the scope of the present invention. For example, while the embodiments described above refer to particular features, the scope of this invention also includes embodiments having different combinations of features and embodiments

TYPES

| Reserved Name | Element | Contained in | Description |
| --- | --- | --- | --- |
| TYPE | VAR | ZONE | The TYPE of a zone can contain any string the author desires. It is used by some software systems to determine libraries of "drag and drop" parts that can be added to a product at configure time, such as a stack of drawers that can be dragged into a empty |

TYPES

| Reserved Name | Element | Contained in | Description |
|---|---|---|---|
| TYPE | VAR | PART | cell of a cabinet product.<br>XML Example:<br><zone name="UnderTheCounter"><br>  <var name="TYPE"<br>    value="HoleForDrawers" /><br></zone><br>The TYPE of a part can contain any of the following strings: PANEL, EXTRUSION, TURNING, or DIMENSION. These determine how other reserved variables and arrays define the part. (For example, the reserved variable DISPLAYVALUE only has meaning inside a part of type DIMENSION.)<br>XML Example:<br><part name="HeightOfProduct"><br>  <var name="TYPE"<br>    value="DIMENSION" /><br>  <var name="DISPLAYVALUE"<br>    formula="thisZone.H"<br>  /><br></part> |

GENERAL

| Reserved Name | Element | Contained in | Description |
|---|---|---|---|
| ISHIDDEN | VAR | PART or OPERATION ARRAY | A numerical variable. If it contains a value that is greater than zero, the parent part or machining operation will be "hidden" from view. Typically defined as a formula, allowing the part to hide itself based on the state of the product.<br>XML Example (if the width of the product is less than 50 inches, then no support bracket is needed. But once the product is made wider than 50 inches, the bracket is shown):<br><part name="ExtraMetalBracket"><br>  <var name="ISHIDDEN" formula="thisZone.W<50" /><br></part> |
| MATERIAL | VAR | PART | Contains a string describing the material that the part is made of. This string can have functional meanings depending on the software consuming the product, but any value is allowed. |
| COST | VAR | PART or ZONE | Contains a numerical value or formula that calculates the monetary cost for a given part or product. By definition, the cost of a product is the sum of all of its parts' costs. |
| NOTES | VAR | PART | Contains any manufacturing note about the part that the author wants to appear on a bill of materials report. |
| BOMGROUP | VAR | PART | Contains a string describing a "group" that the part is placed inside of when a bill or material is generated. Useful for organizing lists of parts into a series of meaningful groups.<br>XML Example:<br><part name="TopHinge"><br>  <var name="BOMGROUP" value="All Hinges" /><br></part> |
| REPEAT | VAR | PART | If this value is greater than zero, it denotes how many times to repeat this part. For example a REPEAT="1" will mean that the part has two instances inside the model, the base part and the 1 repeated part. Useful for denoting parts that repeat in a regular fashion, such as slats on a fence or stairs in a staircase. Please note that for each repeated part, the software system will set a reserved variable called "REPEATID" that indicates its index in the list of repeated parts, allowing one to create formulas that change position of each repeated part based on "which" copy it is. |

METADATA

| Reserved Name | Element | Contained in | Description |
|---|---|---|---|
| METANAME | VAR | ROOT ZONE | Defines a "friendly name" for the product. Useful for having a root zone name that is descriptive programmatically while maintaining a consumer-facing name with meaning.<br>XML Example:<br><zone name="Window"><br>  <var name="METANAME" value="Sliding Window" /><br></zone> |
| METADESCRIPTION | VAR | ROOT ZONE | Defines a long description of the product. Useful for storing marketing copy. |
| METAINTRO | VAR | ROOT ZONE | Defines a short description of the product (5-15 words). Generally displayed beneath the name of the product when shown in list view. |
| METASKU | VAR | ROOT ZONE | Defines the manufacturer's SKU (Stock Keeping Unit), generally a unique string of letters and numbers that define the product distinctly. Often, the metaSKU is defined as a formula so that one parametric product can integrate with legacy systems that rely on SKU database.<br>XML Example:<br><zone name="Window"><br>  <var name="METANAME" value="'WIN' + Wndow.W" /><br></zone> |
| METAMANUFACTURER | VAR | ROOT ZONE | Defines the name of the manufacturer. |
| METAURL | VAR | ROOT ZONE | Defines a URL for a marketing website where a consumer can learn more about the product. |
| METANOTES | VAR | ROOT ZONE | Contains any notes that generally describe something about the product or its history. |
| METAPUBLISHDATE | VAR | ROOT ZONE | Contains a timestamp value defining when the product was published. Interacts with the root zone's FILE variable to allow a manufacturer to publish up to date versions of the product as needed. |
| METAAUTHOR | VAR | ROOT ZONE | Contains the name of the person who created the product. |

WEB INTERACTION

| Reserved Name | Element | Contained in | Description |
|---|---|---|---|
| . . . | INCLUDE | ANY | The INCLUDE element contains an attribute called "URL" that defines a remote data source. INCLUDEs are downloaded at run time and the content of their URL completely replaces the INCLUDE element inside the tree hierarchy.<br>XML Example:<br><include name="http://www.anywhere.com/SomeFile.xml"> |
| GUIURL | VAR | ROOT ZONE | Contains a URL where a web-based configurator program can be found that is specific to this product. Allows manufacturers to create custom web configurators on a product-by-product or catalog-by-catalog basis. This configurator can be programmed in any programming environment that can accept an XML stream as POST data and can return the newly configured XML via a HTTP download request. |
| FILE | VAR | PART | Contains a URL where the software can download a file describing complex geometry for the part (generally in DWG, SKP, or Collada file format). If this variable is defined, the software will attempt to download the geometry file and place it inside the part, scaling it to fit the parametric size and position. Useful for complex geometry such as a curved table leg |

WEB INTERACTION

| Reserved Name | Element | Contained in | Description |
|---|---|---|---|
| | | | that is impossible to draw with prismatic boxes, extrusions, or turnings. |
| FILE | VAR | ROOT ZONE | Contains a URL where the author can post a "canonical" version of the parametric product. Interacts with the METAPUBLISHDATE variable to allow a software system to download the latest version of a product as it is published by the author. |

OPERATIONS ARRAY

| Reserved Name | Element | Contained in | Description |
|---|---|---|---|
| OPERATIONS | ARRAY | PART | This array contains a series of sub arrays. Each sub array defines a CNC machining operation to apply to the parent part. These are things like drilling holes, routing pockets, etc. |
| OPERATION SUBARRAY | ARRAY | OPERATIONS ARRAY | Each of these subarrays represents a single CNC operation. It is the variables within the subarray that define the operation. |
| TOKEN | VAR | any operation | Contains BORE to define a single circular hole, MULTIBORE to define a linear series of circular holes, or POCKET to define a rectangular hole. |
| FACE | VAR | any operation | Defines one of the 6 faces that make up a prismatic part. Possible values include FRONT, BACK, LEFT, RIGHT, INSIDE, and OUTSIDE. This is the face that the machining operation will be applied to. |
| X | VAR | BORE or POCKET operations | Defines the X value to start the machining operation, by imagining the selected FACE as a 2 dimension surface with an origin closest to the part's overall origin. |
| Y | VAR | BORE or POCKET operations | Defines the Y value to start the machining operation, by imagining the selected FACE as a 2 dimension surface with an origin closest to the part's overall origin. |
| STARTX STARTY ENDX ENDY | VAR | MULTIBORE operations | These 4 related variables define a line along which a series of MULTIBORE holes will be machined. STARTX and STARTY define where the first hole in the multibore sequence will be centered. ENDX and ENDY define a point where the line of holes will be drawn toward. |
| PITCH | VAR | MULTIBORE operations | Defines the distance between each of the MULTIBORE holes. If one needs to define a hole every 2 inches, then the PITCH will contain "2". |
| DIAMETER | VAR | BORE or MULTIBORE operations | Defines the diameter of the hole to drill. |
| DEPTH | VAR | Any operation | Defines how deeply the operation is cut or bored into the part. |
| L | VAR | POCKET operation | Defines the length of the rectangular POCKET, with the L dimension measured along the selected FACE's X axis. |
| W | VAR | POCKET operation | Defines the width of the rectangular POCKET, with the W dimension measured along the selected FACE's Y axis. |

System-Created Variables

These variables are automatically calculated and made available for formulas. In this illustrated embodiment, they cannot be explicitly set, only read.

| Reserved Name | Element | Contained in | Description |
|---|---|---|---|
| LEFTX | VAR | PARTS and ZONES | Contains the far left X value as defined by the parent element's bounding box. |
| RIGHTX | VAR | PARTS and ZONES | Contains the far left X value as defined by the parent element's bounding box. |

-continued

| Reserved Name | Element | Contained in | Description |
|---|---|---|---|
| TOPZ | VAR | PARTS and ZONES | Contains the largest Z value as defined by the parent element's bounding box. |
| BOTTOMZ | VAR | PARTS and ZONES | Contains the smallest Z value as defined by the parent element's bounding box. |
| FRONTY | VAR | PARTS and ZONES | Contains the closest Y value as defined by the parent element's bounding box. |
| BACKY | VAR | PARTS and ZONES | Contains the farthest back Y value as defined by the parent element's bounding box. |
| EXTRUSIONLENGTH | VAR | PARTS of type EXTRUSION | Contains the total length of material used by an extruded part, including a waste factor that is calculated to leave enough room for miters as the extrusion goes around corners. |
| PATHLENGTH | VAR | PARTS of type EXTRUSION | Contains the total length of the path followed by an extruded part, not including a waste factor for miters. |
| THISPART | VAR | ALL | A "shortcut" variable that contained a reference (aka pointer) the element's parent part. |
| THISZONE | VAR | ALL | A "shortcut" variable that contained a reference (aka pointer) the element's zone. |
| PARENTZONE | VAR | ALL | A "shortcut" variable that contained a reference (aka pointer) the element's parent zone. |
| THISZONENAME | VAR | ALL | Contains the name of the element's current zone |
| PARENTZONENAME | VAR | ALL | Contains the name of the element's parent zone |
| REPEATID | VAR | PART | Contains the index of a part in a list of repeated parts. (See REPEAT variable above.) For example, in the case of a part with a REPEAT of 2, there will be three parts created. The first of these parts will contain a REPEATID of 0, the second will contain a REPEATID of 1, and the third will contain 2. By using this variable in a formula, one can space out each part in a different fashion. XML Example:<br><part name="stair"><br>  <var name="REPEAT" formula="thisZone.H/8" /><br>  <var name="Z" formula="repeatID*8" /><br></part> |

SETTINGS ARRAY

| Reserved Name | Element | Contained in | Description |
|---|---|---|---|
| SETTINGS | ARRAY | ROOT ZONE | The SETTINGS array contains several reserved variables that control the software application loading the parametric product. XML Example (sets the default unit to millimeters)<br><zone name="UnderTheCounter"><br>  <array name="SETTINGS"><br>    <var name="LINEARUNIT" value="MM" /><br>  </array><br></part> |
| LOADONSTARTUP | VAR | SETTINGS ARRAY | Contains a URL to a parametric product data source that the software should load the first time it is opened. |
| BOMGROUPMISCNAME | VAR | SETTINGS ARRAY | Tells the software what to name the bill of material group that parts without a specifically defined BOMGROUP should be placed into. |
| BOMGROUPREPORTNAME | VAR | SETTINGS ARRAY | Tells the software what to title its bill of material report |
| PURCHASELISTGROUPRE-PORTNAME | VAR | SETTINGS ARRAY | Tells the software what to title its purchase list report |
| BOMGROUPSORT | ARRAY | SETTINGS ARRAY | An array that contains variables whose values define sorting order for BOMGROUPs that appear in the product. The name of the child variables correspond to the BOMGROUP names. The values of the child variables are integers, with the lower the number appearing |

SETTINGS ARRAY

| Reserved Name | Element | Contained in | Description |
|---|---|---|---|
| | | | closer to the front of the bill of materials report. |
| PURCHASELISTGROUPSORT | ARRAY | SETTINGS ARRAY | An array that contains variables whose values define sorting order for BOMGROUPs that appear in the product. |
| DXFLAYERS | ARRAY | SETTINGS ARRAY | An array whose variables define how layer names should be output for this product when DXF files for the containing parts are generated. See below for a more complete discussion. |

DXFLAYERS ARRAY

| Reserved Name | Element | Contained in | Description |
|---|---|---|---|
| DXFLAYERS | ARRAY | SETTINGS ARRAY | An array whose variables define how layer names should be output for this product when DXF files for its parts are generated. Useful for outputting a 2D DXF for each part in a product, where certain features are drawn onto explicitly named layers. Often, these layer names are formulaically defined to contain extra data in the layer name that engineering software can parse. |
| HBORE_L | VAR | DXFLAYERS ARRAY | These 4 related variables defien the layer name that horizontal bore boxes will |
| HBORE_R | VAR | DXFLAYERS ARRAY | be drawn during DXF |
| HBORE_F | VAR | DXFLAYERS ARRAY | output. HBORE_L defines the name for bores drawn on the "left" face. The others |
| HBORE_B | VAR | DXFLAYERS ARRAY | are for the Right, Front, and Back faces, respectively. |
| POCKET | VAR | DXFLAYERS ARRAY | Defines the layer name that POCKET operations will be drawn in during DXF output. |
| LINETO | VAR | DXFLAYERS ARRAY | Defines the layer name that LINETO or ARCTO contours will be drawn |
| ARCTO | VAR | DXFLAYERS ARRAY | in during DXF output. Formulas in this variable can refer to a special shortcut operand called TOOLNUMBER, such that each contour segment can be placed onto a certain layer that corresponds to a CNC machine's tool carousel number or alias. The resolved value of this shortcut corresponds to the TOOLNUMBER variable set in that contour segment. If no TOOLNUMBER variable is set in a contour, then that contour will NOT be drawn into the DXF, which is useful for manufacturers who care only to get overall part sizes for nested saw operations, but will run the saw-cut parts on a CNC further downstream. |

Special Variable Attributes

This "special" attributes can be applied directly to a variable attribute. In the same way that a variable can have a name, value, and formula, it can have any of the following:

| Attribute Name | Description |
|---|---|
| ISPRIMARY | Contains a numerical value or a formula. If the value is greater than 0, then this variable is placed in a special category of "primary variables." Primary variables are the small subset of variables that is needed to totally recreate the configuration of this product. For example, a bicycle product could be made up of dozens of parts that interact with one another via potentially hundreds of complex formulas. But at the end of the day, the product itself is defined by perhaps just two variables: WheelSize and PaintColor. These variables would be defined with isPrimary="1", |

| Attribute Name | Description |
|---|---|
| | allowing a software system to store the entire configuration with a very small amount of data. |
| INITIALFOR-MULA | Contains a formula that is executed once only when the product is first opened. Useful for initializing variables that start at a particular value, but can be changed by the end user from there. |
| LABEL | This attribute is used to define a "friendly name" for a variable that is displayed at run time by configuration software. For example, a variable named "DoorX" could have a label of "Left Side of Door", making the UI presented to the end user much easier to understand. |

Formula Functions and Operators

Formulas can contain any of the following operators and functions.

| FUNCTION OR OPERATOR | Description |
|---|---|
| ARITHMETIC OPERATORS | + addition<br>− subtraction<br>* multiplication<br>/ division |
| COMPARISON OPERATORS | These operators result in a 1 or a 0, representing true or false. Their order of operation is higher than all of the arithmetic operators, meaning they are evaluated BEFORE arithmetic.<br>= is equal to<br>!= is not equal to<br>< is less than<br>> is greater than<br><= is less than or equal to<br>>= is greater than or equal to |
| GROUPING OPERATORS | Parentheses can be used to force order of operation |
| ABS( ) | Function returns the absolute value |
| ROUND( ) | Function rounds to the nearest integer value |
| FLOOR( ) | Function rounds down to the nearest integer value |
| CEIL( ) | Function rounds up to the nearest integer value |

Parts of Type "Dimension"

The following variables and arrays have particular meaning within a part of type "DIMENSION"

| Reserved Name | Element | Contained in | Description |
|---|---|---|---|
| TYPE | VAR | PART | If a part is of type "DIMENSION", then the part will display in the software system as a linear, drafting-style dimension that appears in the space defined by the size and position of the part. In the center of the dimension is an editable text control.<br>XML Example:<br><part name="TopWidthDim"><br>  <var name="type" value="DIMENSION" />]<br>  <var name="layout" value="HORIZONTAL" /><br>  <var name="displayValue" formula="TopBoard.1" /><br>  <var name="w" formula="TopBoard.1" /><br>  <var name="h" value="4" /><br>  <var name="d" value="0" /><br>  <var name="x" formula="TopBoard.leftX" /><br>  <var name="y" formula="TopBoard.backY+3" /><br>  <var name="z" formula="TopBoard.topZ+4" /><br>  <array name="editChanges"><br>    <var value="Cabinet.w" /><br>  </array><br>  <array name="editMultipliers"><br>    <var name="Cabinet.w" value="1" /><br>  </array><br></part> |
| LAYOUT | VAR | PART of type DIMEN-SION | Contains one of three string values: HORIZONTAL, VERTICAL, or GRID. Horizontal denotes that the dimension line will appear horizontally with two leaders on the sides. Vertical denotes that the dimension line will appear vertically with two leaders at the top and bottom. GRID denotes a dimension that only appears in an editable grid set aside from the parametric product. (See LABEL below for more details.) |
| LABEL | VAR | PART of type DIMEN-SION | Defines a string label that is used to identify a "friendly name" of the dimension. For example, one might have a dimension part named "CH" for ease of writing formulas, but have a label of "Cabinet Height" for maximum readability by an end user. Also, some software systems will display a grid of all labelled dimensions to the side of the 3D view, allowing one to see a summary of the sizes used in the product. |
| DISPLAYVALUE | VAR | PART of type DIMEN-SION | The value of this variable is what will displayed in the text control of the dimension part. Typically, a horizontal dimension will set this value formulaically to equal its width, and |

| Reserved Name | Element | Contained in | Description |
|---|---|---|---|
| | | | a vertical dimension will set this value formulaically to equal its height, but any formula can be defined. |
| EDITCHANGES | ARRAY | PART of type DIMEN-SION | This array contains a series of variables. The name of these variables is not required (i.e. it is an indexed array, not an associative array.) The values of these variables contain a reference to each variable that changes when this dimension is edited. For example, changing the width of a dimension might increase both the width of an overall product AND the width of an embedded zone. One can define as many "editchanges" variables in this array as desired. |
| EDITMULTIPLIERS | ARRAY | PART of type DIMEN-SION | This array contains a series of variables. The name of each variable corresponds with a variable that is referenced in the editChanges array. The value of each variable contains a numeric multiplier that is applied to any dimension change before it is applied to the end editChanges target. For example, the following example part INCREASES the width of the left zone while decreasing the width of the right zone:<br>XML Example:<br>  <array name="editChanges"><br>    <var value="LeftZone.w" /><br>    <var value="RightZone.w" /><br>  </array><br>  <array name="editMultipliers"><br>    <var name="LeftZone.w" value="1" /><br>    <var name="RightZone.w" value="-1" /><br>  </array> |
| EDITINCREMENT | VAR | PART of type DIMEN-SION | This optional variable sets an "increment" value that is forced on the end user. For example, a value of ".125" would round any dimension that the end user enters to the nearest 1/8 of an inch. Useful for situations in which a parametric product is only available in a set increment of sizes, such as a window being available in 2" incremental widths. |
| MAX | VAR | PART of type DIMEN-SION | Defines a maximum value for this dimension. |
| MIN | VAR | PART of type DIMEN-SION | Defines a minimum value for this dimension |
| MAXALERT | VAR | PART of type DIMEN-SION | Defines an alert message that will appear when the end user attempts to enter a dimension value that is larger than its defined MAX. |
| MINALERT | VAR | PART of type DIMEN-SION | Defines an alert message that will appear when the end user attempts to enter a dimension value that is smaller than its defined MIN. |

DRAG RULES

| Reserved Name | Element | Contained in | Description |
|---|---|---|---|
| DRAGRULE | ARRAY | PART | This array contains sub arrays that define a part's behavior when it is dragged in a 3D view with a mouse pointing device. When a user drags a part, they drag it along a defined axis, and where it drags to inside the product will alter any number of other variables. |
| DRAGCHANGES | SUB ARRAY | DRAGRULE ARRAY | This array contains a series of variables. The name of these variables is not required (i.e. it is an indexed array, not an associative array.) The values of these variables contain a reference to each variable that changes when this part is dragged. For |

-continued

| | | DRAG RULES | |
|---|---|---|---|
| Reserved Name | Element | Contained in | Description |
| DRAGMULTI-PLIERS | SUB ARRAY | DRAGRULE ARRAY | example, dragging the side of the cabine to the right could increase the X value of that part as well as the overall size of an edjacent zone.<br>This array contains a series of variables. The name of each variable corresponds with a variable that is referenced in the dragChanges array. The value of each variable contains a numeric multiplier that is applied to any drag change before it is applied to the end dragChanges target. For example, the following example part INCREASES the width of the left zone while decreasing the width of the right zone:<br>XML Example:<br><array name="dragRule"><br>  <var name="dragAxis" value="thisZone.x" /><br>  <var name="dragIncrement" value=".125" /><br>  <array name="dragChanges"><br>    <var value="thisPart.x" /><br>    <var value="LeftZone.w" /><br>    <var value="RightZone.w" /><br>  </array><br>  <array name="dragMultipliers"><br>    <var name="LeftZone.w" value="1" /><br>    <var name="RightZone.w" value="−1" /><br>  </array><br></array> |
| DRAGINCREMENT | VAR | DRAGRULE ARRAY | This optional variable sets an "increment" value that is forced on the end user. For example, a value of ".125" would "snap" the dragging of a part to ⅛ inch increments. |
| DRAGAXIS | VAR | DRAGRULE ARRAY | Defines the X, Y, or Z axis of any part or zone in the product. This is the imaginary line along which the part can be dragged. For example, setting the dragAxis to "thisZone.x" will allow the part to be dragged left or right. Setting the dragAxis to "thisZone.y" will allow the part to be dragged forward or backward. Setting the dragAxis to "thisZone.z" will allow the part to be dragged up or down. |

Parts of Type "Extrusion"

The following variables and arrays have particular meaning within a part of type "EXTRUSION"

| Reserved Name | Element | Contained in | Description |
|---|---|---|---|
| TYPE | VAR | PART | If a part is of type "EXTRUSION", then the part will be defined with a "section" array describing its 2d cross section, and a "path" array describing the path that the extrusion will take through the product. A common example of an extruded part is a crown molding around the top edge of a cabinet. The molding has a particular cross section, then it is extruded along a 3-part path around the left, front, and right sides of the cabinet. |
| SECTION | ARRAY | PART of type EXTRUSION | Contains 2 subarrays named X and Y that define a series of points that make up the section of an extruded part. The X,Y pairs should be imagined as clockwide, outer path that traces the shapes of the contour in 2D space. |
| PATH | ARRAY | PART of type EXTRUSION | Contains 3 subarrays named X, Y, and Z that define a series of 3D points in the current zone's absolute coordinate space. These points draw out the series of path that an extrusion is sent through. |

Parts of Type "Panel" or "Turning"

The following variables and arrays have particular meaning within a part of type "PANEL" or "TURNING"

| Reserved Name | Element | Contained in | Description |
| --- | --- | --- | --- |
| TYPE | VAR | PART | If a part is of type "PANEL", then it can optionally contain an Edges array that represents a 2-D shape for the panel. For example, a panel part might be a 24 × 24 piece of plywood that is then machined down into a circular tabletop. The Edges array would contain a series of 4 quarter-circle curves that trace out the circle. If a part is of type "TURNING", then it can contain an Edges array that represents a 2-D shape for the half-cross section of the turning. For example, a turned table leg with a fancy shape would have half of that shape defined in the edges array, and the system will perform the 3D "sweep" to create its final turned shape. |
| EDGES | ARRAY | PART of type EXTRUSION | Contains a series of subarrays. Each subarray defines the next "point" in a line that traces the shape of the part in a clockwise fashion. |
| POINT | SUB ARRAY | EDGES ARRAY | Contains several child variables that collectively define the next point in the shape of the part. |
| X | VAR | POINT ARRAY | These two related variables define the 2D position of the next point in the shape of the part. |
| Y | VAR | POINT ARRAY | |
| TOKEN | VAR | POINT ARRAY | Contains "START", "LINETO", or "ARCTO". Defines the nature of the line that is drawn into this point. STARTTO token is always contained in the first point in the Edges array. LINETO tells the system to draw a straight line to this point. ARCTO tells the system to draw an arc segment to this point. |
| ISCONCAVE | VAR | POINT ARRAY | Contains "0" or "1". Concavity is in terms of the finished part, meaning concave curves will bulge toward the center of the part (or "into the material") and non concave curves will bulge away from the center. |
| DROP | VAR | POINT ARRAY | Contains a numerical distance that denotes how "big" the bulge is in an ARCTO point. The distance is measured from the midpoint of an imaginary segment from the previous point to this point, then measured at a 90 degree angle from that imaginary point to the intersection of the curve. For example, a DROP of 1 inch will deviate 1 inch from a straight line at the center of the arc. |
| RADIUS | VAR | POINT ARRAY | An alternative to defining an arc with a DROP is to define the radius of the arc. Use this variable in place of DROP to do so. Please note that one must also define ISMAJORARC is one wants to use the radius. |
| ISMAJORARC | VAR | POINT ARRAY | In the case of an ARCTO that is defined as a radius, this boolean will contain "1" or "0" to denote whether the ARCTO is greater than a half circle (i.e. is "major") or is less than a half circle (i.e. is "minor".) This is needed because with a given radius and two points that a circle must go through, there are two possible center points for that circle. ISMAJORARC identifies which of these two circles is desired. |
| TOOLNUMBER | VAR | POINT ARRAY | This optional var defines a CNC tool number that the current segment should be machined with in a manufacturing process. Useful for defining a certain segment to be cut out with a profiled-tool (such as a fancy edge for a cabinet front) versus anormal, flat too (such as one would use for the back of a cabinet top that will be butting against a wall when installed.) |

We claim as follows:

1. A system for parametric modeling of a three dimensional object, the system comprising:
 a processor running a software program, wherein the software program is operable to configure the three-dimensional object by defining:
  a zone comprising a root of a tree hierarchy, the zone further comprising a three-dimensional boxed region defining an outer dimension of the three-dimensional object to be modeled, the zone defining a size, location and rotation in space of the three-dimensional object to be modeled, and the three-dimensional boxed region defining a maximum height, a maximum length, and a maximum width of the three-dimensional object to be modeled;
  a part comprising a child of the zone, the part further comprising a component object to be modeled, wherein the component object is an element of the three-dimensional object;
  a variable comprising a child of the part, the variable comprising data defining characteristics of the zone or the part, wherein the variable includes a variable formula that modifies the data of the variable according to a mathematical expression, the mathematical expression containing operators that act upon dynamic values from other variables inside the tree hierarchy;

a plurality of options comprising children of the variable, wherein each of the plurality of options correspond to a specific value that is applied to the data of the variable upon one of the plurality of options being selected by an end user; and a user interface operable by the software program for displaying a representation of the three-dimensional object, the user interface comprising three simultaneous views of the three-dimensional object including a three-dimensional view, a tree view, and a text view;

wherein the tree view displays a hierarchy between the zone, the part, and the variable;

wherein the text view displays information describing the zone, the part, and the variable.

2. The system of claim 1, wherein the software program further defines a second zone nested within the zone.

3. The system of claim 1, wherein the part comprises multiple variables.

4. The system of claim 1, wherein the variable comprises a reserved variable.

5. The system of claim 4, wherein the reserved variable comprises a variable distinguishing a length of the part.

6. The system of claim 1, wherein the variable further comprises a name and a value, the value being configurable by a user.

7. The system of claim 1, wherein the software program is further operable to configure the three-dimensional object by defining an array, wherein the array comprises a collection of variables contained within a part or a zone.

8. The system of claim 7, wherein the array comprises an associative property.

9. The system of claim 7, wherein the array comprises a linear property.

10. The system of claim 1, wherein the software program is further operable to configure the three-dimensional object by defining an include element, the include element operable to access data across multiple parts or three-dimensional objects.

11. The system of claim 10, wherein the software program substitutes the include element with underlying tree hierarchy data associated with the include element in the zone tree hierarchy.

12. The system of claim 1, wherein a change to a parameter associated with the zone results in a proportional change to the part.

13. The system of claim 1, wherein a reserved library is stored in a database functionally associated with the software program.

14. A computer-implemented method carrying out instructions on a computer processor for modeling a three-dimensional product comprising:

defining a zone, in at least one storage device accessible to the computer processor, as a root of a tree hierarchy, the zone comprising a three-dimensional boxed space defining a size, location and rotation in space of the three-dimensional object to be modeled, the three-dimensional boxed space defining a maximum height, a maximum length, and a maximum width of the three-dimensional object to be modeled;

defining a part, in at least one storage device accessible to the computer processor, as a child of the zone, the part defining a three-dimensional element of the product;

defining a variable, in at least one storage device accessible to the computer processor, as a nested child of the product or the part, the variable comprising data relating to the product or the part, wherein the variable includes a variable formula that modifies the data of the variable according to a mathematical expression, the mathematical expression containing operators that act upon dynamic values from other variables inside the tree hierarchy;

defining a plurality of options, in at least one storage device accessible to the computer processor, as children of the variable, wherein each of the plurality of options correspond to a specific value that is applied to the data of the variable upon one of the plurality of options being selected by an end user; and modeling, on a display associated with the computer, the three-dimensional product based on the defined zone, part, and variable, wherein the modeling comprises displaying three simultaneous views of the three-dimensional object including a three-dimensional view, a tree view, and a text view;

wherein the tree view displays a hierarchy between the zone, the part, and the variable;

wherein the text view displays information describing the zone, the part, and the variable.

15. The method of claim 14, further comprising the step of defining a library of reserved variables for use with the part.

16. The method of claim 14, further comprising the step of defining an array as a collection of variables related to the part or the zone.

17. The method of claim 14, further comprising the step of defining an include element, the include element operable to access data across multiple parts or three-dimensional products.

* * * * *